(12) United States Patent
Greene et al.

(10) Patent No.: US 8,473,990 B2
(45) Date of Patent: Jun. 25, 2013

(54) SYSTEM AND METHOD FOR LOCAL BROADCASTING

(75) Inventors: Jeremy A. Greene, Acton, MA (US); Victor Odryna, Acton, MA (US); Stephen D. Metzger, Harvard, MA (US); Clifton E. Smith, Hudson, MA (US); David J. Feng, Westford, MA (US); Preston C. Shimer, Westborough, MA (US); Jeremy L. Mordkoff, Pepperell, MA (US); Oscar Purwin, Carlisle, MA (US); Jeffrey Bacon, Shrewsbury, MA (US)

(73) Assignee: Zeevee, Inc., Littleton, MA (US)

( * ) Notice: Subject to any disclaimer, the term of this patent is extended or adjusted under 35 U.S.C. 154(b) by 957 days.

(21) Appl. No.: 12/433,650

(22) Filed: Apr. 30, 2009

(65) Prior Publication Data

US 2009/0276812 A1 Nov. 5, 2009

Related U.S. Application Data

(60) Provisional application No. 61/126,096, filed on Apr. 30, 2008.

(51) Int. Cl.
*H04N 7/18* (2006.01)
(52) U.S. Cl.
USPC ............................................. 725/74; 725/82
(58) Field of Classification Search
None
See application file for complete search history.

(56) References Cited

U.S. PATENT DOCUMENTS

| 5,585,837 | A |  | 12/1996 | Nixon |  |
|---|---|---|---|---|---|
| 5,708,961 | A | * | 1/1998 | Hylton et al. | 725/81 |
| 6,028,643 | A |  | 2/2000 | Jordan |  |
| 6,202,211 | B1 |  | 3/2001 | Williams, Jr. |  |
| 6,314,479 | B1 |  | 11/2001 | Frederick et al. |  |
| 6,907,137 | B2 | * | 6/2005 | Ruehl | 382/128 |
| 7,631,337 | B2 | * | 12/2009 | King et al. | 725/141 |
| 7,869,431 | B2 | * | 1/2011 | Winter et al. | 370/389 |
| 8,024,760 | B2 | * | 9/2011 | Dickens et al. | 725/74 |

(Continued)

OTHER PUBLICATIONS

Consumer Electronics Association (CEA); Product Information—CEA-761-A; Title: DTV Remodulator Specification with Enhanced OSD Capability; Publication Date Jul. 1, 1999.

(Continued)

*Primary Examiner* — Brian Pendleton
*Assistant Examiner* — Jonathan V Lewis
(74) *Attorney, Agent, or Firm* — Preti Flaherty Beliveau & Pachios LLP

(57) ABSTRACT

A video controller broadcasts input video through a premises media, such as a coaxial cable to one or more premises televisions or television channels. When a PC provides the input video, a mode change may occur to direct the video to the PC monitor or to the broadcast output. The video resolution of the PC is set to provide a desired digital television resolution with broadcast video. An audio driver may be used to provide USB audio output from the PC. When the PC monitor or broadcast output is selected for video output, the non-selected output is disabled or provided with a video indication that another video output is active. An EDID can be captured from the PC or PC monitor to assist with mode changes and setting PC video resolution. The input video may be provided directly from a digital video source and broadcast to selected televisions or channels.

18 Claims, 7 Drawing Sheets

U.S. PATENT DOCUMENTS

| | | | |
|---|---|---|---|
| 2002/0104092 A1* | 8/2002 | Arai et al. | 725/87 |
| 2002/0194609 A1 | 12/2002 | Tran | |
| 2003/0014137 A1* | 1/2003 | Saputro et al. | 700/94 |
| 2003/0027517 A1* | 2/2003 | Callway et al. | 455/3.01 |
| 2003/0156218 A1 | 8/2003 | Laksono | |
| 2004/0101046 A1 | 5/2004 | Yang et al. | |
| 2004/0117849 A1* | 6/2004 | Karaoguz et al. | 725/134 |
| 2004/0183756 A1 | 9/2004 | Freitas et al. | |
| 2004/0261094 A1* | 12/2004 | Huslak et al. | 725/25 |
| 2005/0097612 A1 | 5/2005 | Pearson et al. | |
| 2005/0262536 A1* | 11/2005 | Urata et al. | 725/80 |
| 2005/0278740 A1* | 12/2005 | Helms | 725/41 |
| 2006/0053452 A1* | 3/2006 | Lee et al. | 725/81 |
| 2006/0077213 A1* | 4/2006 | Li | 345/660 |
| 2006/0136968 A1* | 6/2006 | Han et al. | 725/71 |
| 2007/0016925 A1* | 1/2007 | Vaysman et al. | 725/39 |
| 2007/0204314 A1* | 8/2007 | Hasek et al. | 725/100 |
| 2007/0250900 A1 | 10/2007 | Marcuvitz | |
| 2008/0189751 A1* | 8/2008 | Weaver | 725/105 |
| 2008/0313666 A1* | 12/2008 | Evenson | 725/28 |
| 2008/0313691 A1* | 12/2008 | Cholas et al. | 725/131 |
| 2009/0125954 A1* | 5/2009 | Ku | 725/109 |
| 2009/0199253 A1* | 8/2009 | Zhang | 725/109 |

OTHER PUBLICATIONS

Sony Electronics News and INformation—Press Room; Sony Announces Details of Two Locationfree Portable Broadband TV Models; May 20, 2004.

HDTV—Way Cool Looking TV; http://www.coolstf.com/mpeg/HDTV/index.html; Mar. 29, 2000.

LG Electronics U.S.A., Inc.; 15" Wireless LCD TV; 2005.

Entone Technologies—Press Release; Consolidated Communications Deploys Entone's Hydra IP Video Gateway; http://www.entone.com/news_and_events/press/01112006; Jan. 11, 2006.

EchoStar Satellite L.L.C.; HD Adapter; Jan. 4, 2006.

LG Electronics; LG Electronics Demonstrates VSBnet Practical Home Network Using Existing Cabling; Jan. 4, 2006.

LocationFreeTV; Operating Instructions, LF-X1, LF-X5, Sony Corporation, 2004.

\* cited by examiner

SYSTEM AND METHOD FOR LOCAL BROADCASTING

CROSS REFERENCE TO RELATED APPLICATIONS

This application claims benefit of U.S. Provisional Patent Application No. 61/126,096 filed Apr. 30, 2008 entitled SYSTEM AND METHOD FOR LOCAL BROADCASTING.

STATEMENT REGARDING FEDERALLY SPONSORED RESEARCH OR DEVELOPMENT

N/A

BACKGROUND

The disclosed system and method relate generally to local premises broadcasting, and relate more particularly to providing local broadcasting over premises media to one or more local destinations over one or more channels using one or more broadcast sources.

Electronic forms of media are ubiquitously available in a variety of forms. Some examples of forms of electronic media include video, moving images, still images, text, graphics, audio and tactile. Electronic media is generally transportable in a variety of forms as well. Some examples of electronic media transport forms are magnetic disks, optical disks, network connections, optical, RF or microwave wireless signaling. At a premises location, such as a personal residence or commercial building locale, electronic media can be presented through a number of forms and devices, including television, telephone, personal computer, radio receiver, satellite receiver, DVD player, CD player and the like, referred to collectively herein as "components." As used herein, premises refers to a general locale of one or more buildings that may be used for any particular purpose, including a personal residence or commercial activity.

As used herein, the term "video" is intended to refer to media that may, and not necessarily, include a combination of audio and image representations, where the image representations may be frame oriented media, such as is available in the MPEG2 (Moving Pictures Expert Group) standard for coding of moving pictures and associated audio information. Thus, as used herein, video may refer to image representations, audio representations or both, where the combination of image and audio representations may correspond or be synchronized.

Distributing video in a local premises has typically been limited to channel selection of a given television connected to a video source through a coaxial cable network. With the variety and different forms of electronic media available for presentation at a premises locale, it is often a challenge to direct one form of electronic media to an arbitrary presentation device or channel. A prime example of such a challenge is directing video available at a personal computer or other component to an arbitrary premises television or channel, and in particular, to an arbitrary high definition television (HDTV) or channel.

It is generally preferable to present electronic media forms with higher fidelity than is available on a personal computer (PC). As used herein, the term PC refers to any type of personal computer, including IBM® type PCs, Apple® Macintosh PCs, and any other type of computer that is typically employed for use by an individual or defined group of individuals. When providing video as the electronic media form, which includes image and audio media, it is generally the case that preferable quality can be obtained when the video is presented on a television set rather than on a PC, especially if the television can display in high definition. As used herein, the term video is meant to include sequences of images or video frames in conjunction with audio that may or may not be synchronized with the image frames. Various sources of video are generally available in media or transport forms suitable for home video viewing, such as digital video disks (or digital versatile disks, that is, DVDs) and DVD players, cable or satellite television broadcast systems, personal computers, digital cameras, networks such as traditional telephone networks or packet switched networks such as the Internet, as well as other types of video sourcing systems, including HD video sources.

A video sourcing system gaining favor for distribution of video media involves the use of the Internet with multiple video sources being available for selection for download by a user to a PC. Typically, video monitors connected to a PC are less aesthetically pleasing in rendering video than a television set, and in particular a high definition television (HDTV) set. In addition, a PC is typically designed for use by a single person so that more than one person wishing to view video content at the same time on a PC becomes less desirable. Accordingly, while the PC generally has access to vast media sources, it is not a preferred presentation format. There is presently no readily available or simple solution for providing Internet connectivity to a conventional or high definition television.

HDTVs in particular, have become popular with homeowners for creating environments in which viewers can spend one or more hours viewing video content. For example, a "media room" that has an HDTV also typically has comfortable seating arrangements, high quality sound systems and other features that improve the experience of the media presentation. However, the transfer of media content from a PC to a media room presentation system, including high definition television and high quality audio systems, is relatively cumbersome. In addition, while a PC could be stationed in a media room to have the PC connect to an HDTV, for example, to provide a media feed to the HDTV, it is usually desirable to avoid such an arrangement. For example, having a PC in a media room can prevent the use of a PC and an HDTV or high quality audio system from being used at a same time, that is, for multiple persons. Moreover, PCs typically offer unwanted distractions, including lights, peripherals and fans that can add noise to an otherwise aesthetically pleasing media presentation environment.

Other types of media sources, including video sources, can be made available for presentation on an HDTV. For example, DVD players, satellite television receivers, digital cameras, digital video recorders and network media sources may be connected to an HDTV to permit image and audio presentations. However, a single media sourcing device or component is typically used in association with a single HDTV, so that no readily available means for selecting among a number of different media sources for presentation on a number of selected HDTVs or channels is readily available.

SUMMARY

The presently disclosed system and method provide a connection path between a number of media sources and a number of televisions. In particular, media sources that include video sources such as PCs, wired or wireless LANS or internet sources, RF broadcast sources, local video sources or components are connected to a media gateway or media server that can broadcast a number of video signals to premises televisions or channels. The media gateway/media server operates as a video controller that modulates an input video source onto a premises media, such as coaxial cable, for selected delivery to specified televisions or HDTVs or specified channels on one or more televisions or HDTVs.

For example, the disclosed system and method permit video content downloaded to or through a PC to be presented on an HDTV with an attendant audio system. The video controller converts the image and audio output of the PC and broadcasts the converted media onto a coaxial cable for receipt by an HDTV. The video controller can cause the media input to be directed to arbitrary or specific televisions or channels, or to be combined with other media sources for broadcast to one or more televisions or channels. The video controller can also provide the input media to a display or presentation device associated with a media source providing the input media. In the above example, the video controller can control video output to be presented on the PC, or on the HDTV, or both.

According to one exemplary embodiment, the system and method provides for a mode change between a media source, such as a PC, and an HDTV. The mode change causes a switch between a video resolution suitable for a media source presentation device, such as a PC monitor, and a video resolution suitable for an HDTV. In addition, an audio signal can be switched between speakers coupled to a media source, such as the PC, and an audio connection, such as a USB port of the PC, to provide a high quality audio signal to accompany image information sent to the HDTV for viewing.

According to another embodiment of the disclosed system and method, input received at either a PC or an HDTV causes a mode change to direct video to a PC monitor or to the HDTV in accordance with the input. An input for the PC, for example, can be provided through any typical input device, such as a keyboard, mouse or other user input commonly associated with a PC. The input for the HDTV can be provided through any type of input to a TV panel, or to a remote for controlling the HDTV, for example.

According to another exemplary embodiment of the disclosed system and method, a privacy mode is enabled in which the PC monitor does not receive video content directed to the HDTV while privacy mode is set. Similarly, if video content is directed to the PC while privacy mode is set, the HDTV does not receive the video content. According to an aspect of the disclosed system and method, the PC monitor or HDTV signal pathways are provided with a message indicating that video is directed to another video output device when privacy mode is set. For example, if video is directed to the PC monitor, a message is displayed on the HDTV indicating that the HDTV is idle or that video is directed to the PC monitor in a privacy mode. Similarly, when video is directed to the HDTV, a message can be made to appear on the PC monitor indicating that the PC monitor is idle or that video is being directed to the HDTV in privacy mode. According to another aspect of the disclosed system and method, privacy mode may be enabled or disabled through the use of a password or coded selection provided to the PC or to the HDTV, dependent upon, or regardless of whether the PC monitor or the HDTV is selected for video output.

According to an exemplary embodiment of the disclosed system and method, the video controller is connected to one or more video source components that provide input video signals to the video controller. The video controller can selectively direct the input video content to one or more televisions or television channels. In such an instance, the video controller can process multiple inputs simultaneously and provide simultaneous local broadcast of differing video content. For example, the video controller may have a processor such as a digital signal processor (DSP) that can use time or code division to simultaneously process multiple inputs, and may have one or more modulators to simultaneously provide local broadcast to one or more televisions or television channels.

According to another embodiment of the disclosed system and method, an extended display identification data (EDID) structure provided by a PC monitor to indicate monitor display capabilities is captured and stored for mode switching purposes. According to one aspect, when video is directed to the PC monitor, the EDID is provided from the video controller to the PC and a PC video mode change command is sent to the PC. The command forces the PC to change video resolution to match that of the attached PC monitor. If video is directed to the HDTV, an HDTV video resolution specific EDID is provided to the PC with a mode change command to cause the PC to provide a video resolution matching that of the desired HDTV resolution. According to one aspect, the EDID read from the PC monitor is used in conjunction with other video resolution modes, to which the monitor EDID is appended, with the group of video resolution modes being provided to the PC for selection by the PC.

According to another exemplary embodiment of the disclosed system and method, an adjustment for television video overscan is provided by modulating the EDID provided to the PC in a specific video resolution mode. HDTVs have a video display overscan, in which an actual video display resolution is larger than the visible screen area. The concept of overscan was originally provided to stabilize an edge area of an analog video image for display prior to becoming visible on the actual analog display. If video taken from a PC video source is displayed on an HDTV screen, the entire overscan area is used for the display by default, causing the display to be cropped so that a portion of the available video display is not visible in the actual display area of the HDTV screen. Accordingly, a setup image is provided to the user to permit adjustment of a PC video display on a television or an HDTV. The setup permits the user to modify the dimensions of the picture in the available display area to match that of the actual display of the HDTV screen. The adjusted resolution is recorded and used to provide the PC with an EDID video resolution that is specific to the configuration adjusted by the user. As a result, switching to a video display mode by providing the customized EDID video resolution to the PC causes the HDTV to display an entire available video display on the visible area of the HDTV screen as an adjustment for the overscan properties of the HDTV configuration.

According to another exemplary embodiment of the disclosed system and method, audio delivery from a media source is customized in dependence upon a presentation device selected for receiving an associated video signal. For example, a PC can provide output audio to a single output at any one time. If the PC is to be the output target for the video signal, the audio is directed to the PC speakers. If the video signal is directed to the HDTV, the audio output of the PC is directed to a USB port to be synchronized and combined with the image signal provided to the HDTV. When the video output is directed to the HDTV, the disclosed system and method causes a USB audio device to be installed in the PC so that the PC directs audio through the USB audio device to permit the audio signal to be provided to the HDTV. When the video is directed to the PC, the USB audio device is removed, so that the PC no longer has an option of providing audio to the USB audio device. The disclosed system and method may continue to use the USB port for control and messaging as a serial device, in either case of the USB audio device being installed or removed.

According to another exemplary embodiment of the disclosed system and method, a video controller can synthesize one or more video output signals that represent one or more inputs from various media sources such as a PC VGA connector, USB connector, local video sources such as DVD players, video cameras, broadcast, satellite or cable television sources. The inputs can be analog or digital, and in the form used by VGA, DVI (Digital Visual Interface), HDMI (High Definition Multimedia Interface) or other video signal interfaces, for example. In addition, the inputs can be previously encoded or compressed in a format suitable for application to a modulator that can provide digital modulation of multiple inputs. Various media inputs can be combined, for example, into a coded bit stream that is used to modulate a carrier signal for transmission to a premises television. The video controller can process multiple media source inputs and/or combine, multiplex or switch various media sources to be directed to different channels or televisions. The media sources may be provided through a PC as peripherals to the PC, or may be directly connected to the video controller.

According to another exemplary embodiment of the disclosed system and method, a control is provided for modifying a quality/latency level of a video signal with respect to activities provided through the video signal channel. The latency of a video signal provided to an HDTV can be controlled to permit relatively fast modifications to the video output upon receiving an indication for the same. For example, an individual viewing an HDTV presentation may wish to modify an aspect of the presentation with respect to the media input from the media input source. When a user input is detected, the video controller switches between latency levels to permit the video display to react to the user input. For example, if the media input is a video signal provided by a PC, a user input may be provided to control the video signal being displayed on an HDTV. Interactive events that are associated with video activities are permitted with the change in latency to provide a useful interaction between the user and the HDTV while maintaining a desired level of responsiveness. For example, during a mode change from a PC display to an HDTV, video signal latency can be modified to provide a highly responsive interaction between the user and the HDTV display.

High definition digital encoding uses the MPEG2 encoding scheme, which is computationally intensive. When MPEG2 encoding is provided in real time, quality is improved by analyzing a greater number of frames of a video input. The computationally intensive encoding, coupled with an increased number of video frames to analyze, can cause a higher than normal degree of latency between the PC as a video source and the video displayed on an HDTV. The increased latency can be a problematic issue if a user chooses to interact with the video display, such as often occurs with the use of a mouse cursor provided through a mouse action at the PC.

In accordance with the disclosed system and method, a quality/latency level of the MPEG2 video is adjusted to reduce the attendant latency to permit other interactive video events to occur in correspondence with actual user activities. In one exemplary embodiment, the quality of the MPEG2 video is decreased by dropping video frames to permit an increase in bandwidth for activities being addressed to the PC video monitor. According to an aspect, video quality versus latency is adjusted on a dynamic basis. For example, observed mouse activities causes the video quality to be rapidly adjusted, such as by being decreased, with an attendant change or decrease in latency. A change, such as a decrease in video quality and latency, is maintained until the occurrence of a particular event, such as the expiration of a time interval from a last observed mouse event. Alternately, or in addition, if a limited number of mouse events are observed, the picture quality is increased to a point at which the limited mouse activity can be accommodated with an acceptable level of latency. If limited or no mouse events are observed for a given period of time, the picture quality is increased, either rapidly or gradually, until full picture quality is restored or another mouse event is observed.

BRIEF DESCRIPTION OF THE SEVERAL VIEWS OF THE DRAWINGS

The disclosed system and method are described in greater detail below, with reference to the accompanying drawings, in which.

DETAILED DESCRIPTION OF THE PREFERRED EMBODIMENTS

The entire disclosure of U.S. Provisional Patent Application No. 61/126,096 filed Apr. 30, 2008 entitled SYSTEM AND METHOD FOR LOCAL BROADCASTING is hereby incorporated herein by reference.

Figure 1:
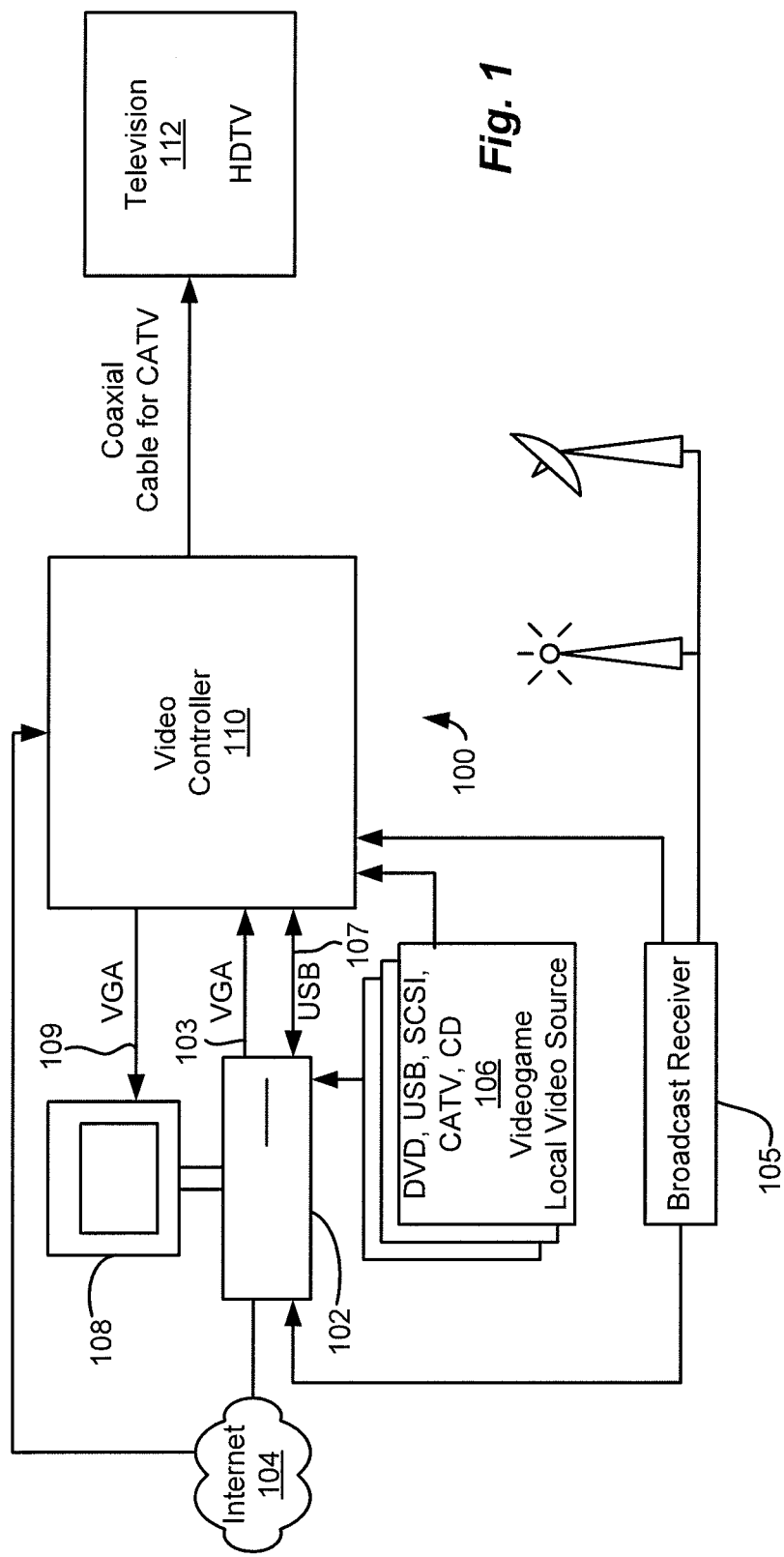
FIG. 1 is a block diagram of a local broadcast system.

Referring to FIG. 1, an embodiment of the disclosed system and method is illustrated as video system 100. Video system 100 includes various media sources including video sources that can provide electronic images and audio representations, referred to herein generally as video. A video controller 110 receives input from one or more media sources, illustrated as internet/LAN 104, PC 102, local media sources 106 and broadcast media sources obtained through broadcast receiver 105. The input from the media sources may be HD video, analog or digital, and may have an encoded format, for example, so that the input need not be encoded, formatted or compressed by video controller 110. For example, a media source may provide video using MPEG2 video encoding that can be directly applied to a modulator to produce a video signal that can be transmitted to a television for demodulation and presentation. The input from the media source may be encoded if desired and modulated for transmission over a premises distribution media, such as a coaxial cable, to television 112.

Video system 100 illustrates various topologies for device connection, including direct connectivity with video controller 110 to provide a direct media input, or through PC 102 in the form of peripherals or PC-connected media sources. PC 102 can provide media input to video controller 110 through a VGA connection 103 or a USB connection 107, so that PC 102 is capable of providing video to video controller 110 over multiple channels.

While any of the media sources shown in video system 100 may be used with direct connections to video controller 110 in accordance with the disclosed system and method, the illustrated media sources may also be used through connections provided to PC 102 in accordance with the disclosed system and method. That is, various aspects of the disclosed system and method such as the use of multiple media sources to generate a video output, multiple video outputs to separate televisions or channels, mode changes to direct media output to PC 102 or a television 112 and an HDTV, changes in resolution and configurations of media input devices, may all be implemented using any of the illustrated media sources either through direct connections to video controller 110 or through connections provided to PC 102. Various aspects of the disclosed system and method are described below with respect to an exemplary embodiment involving PC 102 as a media source for generating a video signal supplied to a television 112. It should be apparent that the disclosed system and method is equally applicable to the various media sources directly connected to video controller 110.

Media content provided from sources such as Internet/LAN 104 or local video sources 106 may include image frames, audio that is synchronized or not synchronized with the image frames or other various combinations of image and audio media, referred to herein collectively as video. Local video source 106 may include various video media types accessible by PC 102, including DVDs, MP3s, CDs, and any other type of video media including media available from a broadcast receiver 105 or modem delivered video media. The media content can be delivered in digital or analog form, and can use any convenient interface protocol, including VGA, DVI or HDMI. In an exemplary embodiment, PC 102 can act as a point source for video that is to be displayed on a television, preferably an HDTV. PC 102 can also provide audio in conjunction with supplied video, i.e., synchronized with video frames, or can provide audio as a separate media source independent of image data. For example, the audio provided by PC 102 can be supplied to a high quality sound system in a given video presentation mode.

Video controller 110 is disposed between PC 102 and a television 112, which can be an HDTV. Video controller 110 connects to PC 102 using a VGA path loop back, in which video controller 110 resides between VGA connector 103 for PC 102 and a VGA connector 109 for PC monitor 108 of PC 102. With this configuration, video controller 110 can intercept output from VGA connector 103, 109 of PC 102 or monitor 108, and provide commands and information to VGA connector 103, 109 of PC 102 or monitor 108.

Video controller 110 is also connected to a USB port of PC 102 through a USB connection 107, which can provide a serial control pathway between PC 102 and video controller 110. In addition, USB connection 107 can be used to obtain high quality audio output from PC 102 that can be passed to television 112. USB connection 107 may also be used to support a video stream supplied to video controller 110.

Video controller 110 is coupled to television 112 using premises media, such as a coaxial cable, which may be the same cable used to provide cable TV (CATV) signals to television 112. Video controller 110 broadcasts a video signal onto the coaxial cable, which is picked up for presentation using television 112 on a selected channel, in accordance with an exemplary embodiment. By using the coaxial cable, PC 102 and television 112 can be located remotely from each other in a local area, since the coaxial cable can carry high quality video signals over substantial distances without significant degradation.

Figure 2:
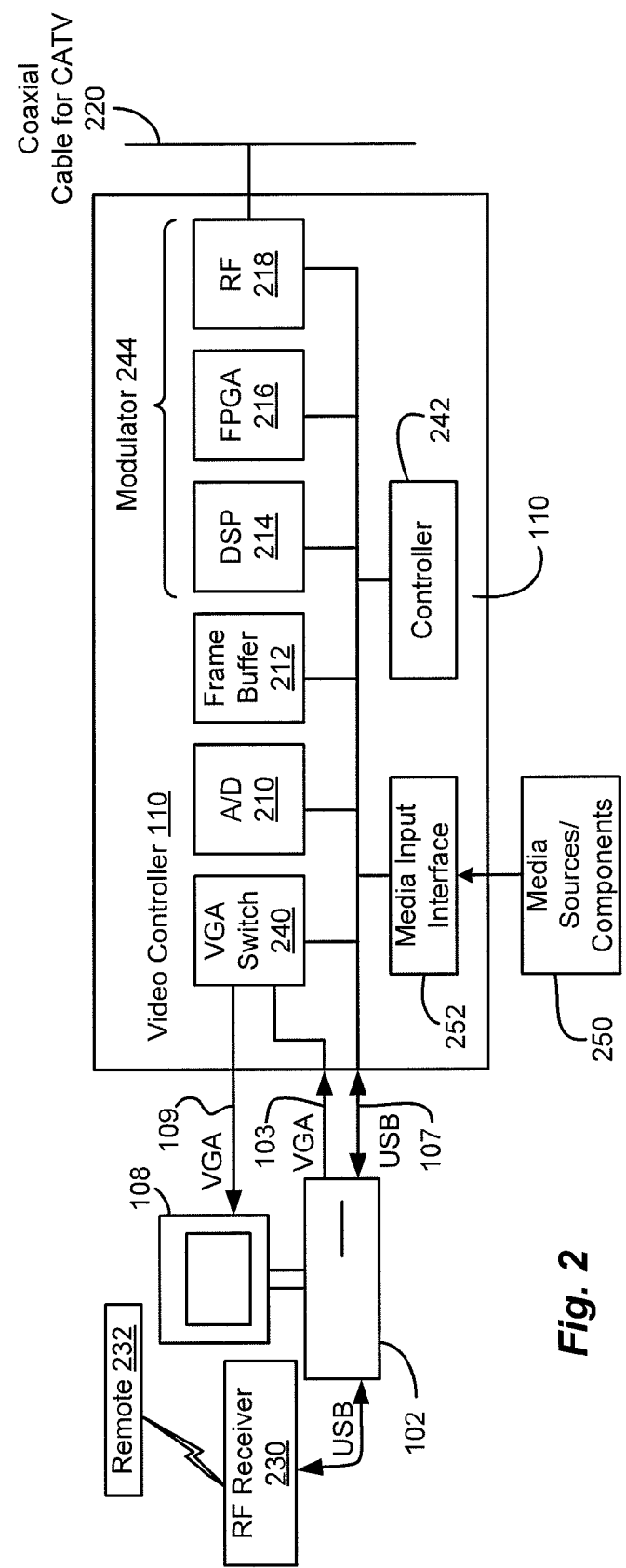
FIG. 2 is a block diagram of a controller for the system of FIG. 1.

Referring to FIG. 2, video controller 110 receives image and audio data from VGA connection 103 and a USB connection 107, respectively, on PC 102. Alternatively, or in addition, video controller 110 receives video data through USB connection 107 and/or a media input interface 252. As illustrated in FIG. 1, media input provided to video controller 110 can be directed through PC 102 or can be sourced directly from various media devices such as internet/LAN 104, PC 102, local media sources 106 and broadcast media sources obtained through broadcast receiver 105. The media sources directly connected to video controller 110 are illustrated as media sources/components 250 shown in FIG. 2, which are connected through media input interface 252. Media input interface 252 represents any type of connection generally used for transmitting media, including analog and digital signals, and typical interfaces such as VGA, DVI and HDMI.

The signals from VGA connection 103, and/or USB connection 107 of PC 102 are fed to video controller 110, where, if desired, they can be converted from analog to digital with analog to digital converter (ADC) 210. The image and audio data are stored in a frame buffer 212 as a queue for supplying video to digital signal processor (DSP) 214 for rendering high definition video. The output high definition video from DSP 214 is provided to a field programmable gate array (FPGA) 216, where simple and fast functions are provided for manipulating the HD video stream. For example, FPGA 216 may provide final transport stream wrapping, and other functions for delivering high definition video to an HDTV. The transport stream containing the HD video is delivered to radio frequency (RF) section 218, where the video is modulated onto a channel for broadcast over coaxial cable 220. The channel onto which RF section 218 modulates the transport stream carrying the HD video can be selected in accordance with a particular algorithm. A number of different channels may be used, which can provide multiple video outputs to one or more different televisions. The output signals may include broadcast signals suitable for use in an analog or digital format for corresponding video channels.

Video controller 110 has a controller 242 that provides control signals to realize the functions and operations of video controller 110 described herein. For example, controller 242 can provide control signals to PC 102 to control a video resolution for video information provided by PC 102. Controller 242 can also cause an audio driver to be installed or removed from PC 102 to permit PC 102 to selectively direct audio information to video controller 110. Controller 242 can also provide control signals to cause a mode change between a PC mode and a TV mode, which are described in greater detail below. Controller 242 can also cause a configuration display to be provided to television 112, and capture overscan information based on the configuration display. Controller 242 may be implemented as a microcontroller with associated memory storage, or a processor that has onboard or external access to memory storage. Accordingly, video controller 110 can have memory storage (not shown) available for controller 242, as well as memory storage for other purposes such as implementing frame buffer 212, for example.

DSP 214, FPGA 216 and RF section 218 may be referred to generally as a modulator 244 in which input signals are used to modulate a carrier signal to produce a modulated output signal for transmitting the digital signals. The input signals can be analog or digital, and are generally converted to digital form prior to modulation. For example, an analog input may be converted to digital form by modulator 244, or may be applied to ADC 210 to produce a digital signal used by modulator 244. Modulator 244 can accept multiple input signals from multiple sources, such as from VGA connection 103, USB connection 107 and/or media input interface 252. The input signals provided to modulator 244 can be directed to DSP 214 or FPGA 216, depending upon whether further processing is desired prior to digital modulation of a carrier in RF section 218. In general, modulator 244 can produce digital data in the form of a bit stream that can incorporate media information from a number of different media inputs. The bit stream is used to digitally modulate the carrier signal in RF section 218 to provide the modulated output signal that is transmitted over coaxial cable 220. Accordingly, video controller 110 can provide simultaneous broadcast of a number of different digital channels, each of which can provide a display of a given input media source.

PC 102 can be remotely controlled with an RF capable remote control 232. Remote control 232 includes an RF transmitter that can communicate with an RF receiver 230 that is coupled to PC 102 through a USB port, for example. Remote control 232 can be used as the TV input source to cause a mode switch from PC mode to TV mode, which are described in greater detail below. In addition, remote control 232 is equipped with input devices that can control input to PC 102. The user can use remote control 232 to provide input to PC 102 to cause a switch to PC mode, or can provide input for television 112 to cause a mode switch to TV mode. The various different inputs provided by remote control 232 are delivered to PC 102 through RF receiver 230, and detected by video controller 110 to cause mode changes or other control function implementations. Thus, a user may switch between different modes available from video controller 110, even if not in the vicinity of video controller 110, as may be common when PC 102 and television 112 are located in separate areas of a premises, for example.

By using remote control 232, a user can, for example, control a video presentation mode on television 112 to view content generated or provided by PC 102 or to view input media content on television 112. For example, a user can manipulate remote control 232 to cause television 112 to provide a display similar to a typical computer display, such as one having icons, menus or other computer functionality indications. The user may also use remote control 232 to cause television 112 to display media content that is provided to PC 102 or provided by local media sources 106 or by broadcast receiver 105, such as video or other media content. The user need not be present at either PC 102 or television 112 to control the display of television 112 using remote control 232.

Mode Switching

In accordance with an exemplary embodiment of the disclosed system and method, video controller 110 provides for a mode change between PC 102 and television 112. The mode change causes a switch between video resolution of the video signal output from PC 102, such that the video resolution is suitable either for PC monitor 108 or television 112. The mode switch also causes an audio signal to be switched between an audio output for PC 102, typically PC speakers, and an audio output from PC 102 over USB connection 107.

In accordance with an exemplary embodiment, video controller 110 directs video to PC monitor 108 in one mode, referred to as PC mode, and directs video to television 112 in another mode, referred to as TV mode. When video controller 110 is in PC mode, the video resolution provided by PC 102 is selected for monitor 108. When video controller 110 is in TV mode, video controller 110 sets the resolution of the video output of PC 102 to be suitable for displaying video on television 112. Some examples of video resolution used with PC 108 include VGA: 640×480; XGA: 1024×768 and SXGA: 1280×1024. Examples of available resolutions for HDTV include 720 p, 1080 i and 1080 p where the p stands for progressive, or typically 60 frames a second, and i stands for interlaced, meaning that half an image is sent typically 60 times a second or a full image typically 30 times a second. In an interlaced mode the image is sent using every other line for each frame. Frame rates may vary depending upon differing standards in use for a television display, such as NTSC, PAL, or SECAM. The resolution of 720 p is typically 1280×720, while the resolution of 1080 i and 1080 p is typically 1920×1080.

A typical aspect ratio of PC monitor 108 can be 5:4, while a typical aspect ratio of television 112 can be 16:9. It is generally difficult to translate between the resolutions available in PC 102 and the resolution used by television 112. According to an embodiment of the disclosed system and method, PC 102 is commanded to change the resolution of the output provided to VGA connection 103 for use with either PC monitor 108 or television 112.

Accordingly, video controller 110 commands PC 102 to select a video resolution for monitor 108 in PC mode, and to select a video resolution suitable for television 112 in TV mode. Video controller 110 performs a mode change by capturing and storing the EDID from PC monitor 108 to have a record of the video resolution desired for monitor 108. When system 100 is in PC mode, video controller 110 provides the captured and stored EDID from monitor 108 to PC 102 and causes a video resolution change. The video resolution change is caused by providing a command to PC 102, typically over USB connection 107 to prompt a read of the EDID provided by video controller 110 and implement the video resolution called for by the information in the EDID.

When system 100 changes to TV mode, video controller 110 provides an EDID suitable for changing video resolution output by PC 102 to a format used by television 112. If a switch to PC mode is made, video controller 110 provides the captured and stored EDID from PC monitor 108 to PC 102 and forces a video resolution change so that the output video resolution from PC 102 matches that of PC monitor 108.

Merged EDID

According to another aspect of the disclosed system and method, a merged EDID is used for video switching, especially when switching between PC mode and TV mode. The technique uses a display data channel (DDC), which is a digital connection between a computer display and a graphics adapter that allows the display to communicate its specification to the adapter. DDC is a standard that was created by the Video Electronics Standards Association (VESA). The DDC link is carried on three pins in a 15 pin VGA connector or interface, a DVI connector or interface, or an HDMI connector or interface, and represent data, clock and ground signals. Monitor 108 has a non-volatile memory, such as a ROM, that is programmed by the manufacturer, for example, with information about the graphics modes that the monitor can display. The data in the memory of the monitor is provided in a standard structure format referred to as the EDID.

The ATSC (Advanced Television Systems Committee) television standard encoding supports 480 p, 720 p and 1080 i. In addition, PC 102 may be able to support a number of different types of resolutions, especially from a set of preferred resolutions. According to one embodiment, video controller 110 reads the EDID from monitor 108 and appends one or more HD video resolution modes prior to submission of the block of modes to PC 102. PC 102 has a graphics card that supports a number of video resolutions and modes. Video controller 110 requests the available modes from PC 102, to determine what modes the graphics card can support. The supported modes can be provided to the user in an initial configuration of system 100 to permit the user to choose among supported high definition video resolutions, for example. In addition, video controller 110 can determine the supported video resolution modes that are available in the graphics adapter of PC 102. Video controller 110 can also program the non-volatile memory of monitor 108 with video resolutions, such as by storing the video resolutions in an eprom provided in monitor 108 in accordance with DDC standards. In such an instance, monitor 108 can be used to return desired video resolutions for submission to PC 102 to cause a video resolution mode change.

PC monitor 108 has a control channel called DDC2, defined by the VESA standard. Monitor 108 sends the EDID over DDC2 to PC 102 at certain times, such as when requested. The EDID provided by monitor 108 contains all the resolutions supported by the monitor. Typically, many different types of resolutions are supported.

Some applications may force some lower resolutions. In this instance, video controller 110 may provide a true "multi-sync" display, or provide a capability to accept many different input resolutions. For example, video controller 110 may be able to sync a wide variety of PC video resolutions and perform scaling without a significant impact on video quality.

Note that the multi-sync support does not have to produce the best video. Providing multi-sync capability in video controller 110 may cause television 112 to operate in a less preferable resolution mode (non-HD resolutions) initially.

One method to implement multi-sync is to choose an output video stream resolution that is larger than the input stream resolution, and centering the input video stream within the larger output stream image. The input video may effectively overlay the output image, which may be entirely composed of a solid color, such as black. For example, any input with a horizontal resolution below 640 pixels and a vertical resolution of less than 480 pixels is displayed as a 640×480 image with black space on the top, bottom and sides as needed. Similarly, for an input greater than 640×480 and equal to or less than 1280×720, the input can be displayed on an output resolution of 1280×720 with surrounding solid color borders. The same display method can be used for an input greater than 1280×720 and equal to or less than 1920×1080.

The table below illustrates a different approach than that described above for implementing multi-sync. The approach using the contents of the table below uses image scaling. With this approach, computer resolutions are displayed in full on television 112 in high definition mode. A set of resolution conversion operations may be used.

Because ATSC encoding supports 480 p, 720 p and 1080 i, converting or scaling all the possible PC resolutions to one of the supported ATSC encodings is not trivial, and usually produces unwanted video artifacts. Accordingly, video controller 110 forces PC 102 into one of the high definition video resolutions when television 112 is in use, for example in TV mode. Video controller 110 generates EDID information with 720 p and 1080 i and causes PC 102 to read the new EDID information. Video controller 110 can query PC 102 to obtain supported video resolutions available with the video card installed in PC 102.

Video controller 110 configures video resolution by retrieving an intersection of video resolutions available from monitor 108 and video resolutions available from a video adaptor in PC 102. If available, video controller 110 may offer an option for the user to select among HD resolutions, such as 720 p or 1080 i.

Video controller 110 determines the resolution supported by the video adapter in PC 102 as well as monitor 108. The configuration read from PC monitor 108 is saved in video controller 110. Video controller 110 may then supply video resolution information to PC 102 for HD video resolution including 720 p and 1080 i. Video controller 110 then forces a read operation by PC 102, and then determines whether PC 102 can produce HD resolution, such as 720 p or 1080 i. In this way, video controller 110 can determine the video resolution available in PC 102, in particular for use with a high definition television display.

Automatic Mode Switching

When activity occurs at PC 102, such as a mouse movement, keyboard input, or other PC device input, video controller 110 changes to PC mode and provides the appropriate video resolution command to PC 102 to properly display, for example, in a 5:4 aspect ratio on monitor 108 in accordance with the resolution indicated to be available from PC monitor 108. When input is provided to television 112 such as with remote control 232, which may be a customized remote control for providing user input or switching modes between PC mode and TV mode, video controller 110 detects the input and may cause a mode change to TV mode. The input that

|  |  | VGA<br>640 × 480 | XGA<br>1024 × 768 | SXGA<br>1280 × 1024 | UXGA<br>1600 × 1200 | WXGA<br>1366 × 768 | WSXGA<br>1680 × 1050 | WUXGA<br>1920 × 1200 |
|---|---|---|---|---|---|---|---|---|
| 720p | Final | 640 × 480 | 960 × 720 | 900 × 720 | 960 × 720 | 1280 × 720 | 1152 × 720 | 1152 × 720 |
|  | Hor. | Inset | Rescale | Rescale | Rescale | Rescale | Rescale | Rescale |
|  | Ver. | Inset | Rescale | Rescale | Rescale | Rescale | Rescale | Rescale |
| 1080i | Final | 640 × 480 | 1024 × 768 | 1280 × 1024 | 1440 × 1080 | 1366 × 768 | 1680 × 1050 | 1728 × 1080 |
|  | Hor. | Inset | Inset | Inset | Rescale | Inset | Inset | Rescale |
|  | Ver. | Inset | Inset | Inset | Rescale | Inset | Inset | Rescale |

Horizontal Filters:
1) 1024→960
2) 1280→900
3) 1600→960
4) 1366→1280
5) 1680→1152
6) 1920→1152
7) 1600→1440
8) 1920→1728
Vertical Filters:
1) 1200→720
2) 768→720
3) 1024→720
4) 1050→720
5) 1200→1080 causes a mode change when video controller 110 is in PC mode may be configured to be automatic, so that input through remote control 232 puts or maintains video controller 110 in TV mode. Alternately, or in addition, remote control 232 may be configured to accept a command to cause a mode change, which may result in a change to PC mode or TV mode.

According to an exemplary embodiment, video controller 110 can be configured to recognize different actions for different input criteria. For example, input provided by a mouse connected to PC 102 can be ignored for the purposes of changing modes. Input provided to PC 102 can be used to cause an automatic mode change to PC mode, or certain commands may be applied to PC 102 to cause a mode change, either to PC mode or to TV mode. PC 102 or video controller 110 may also be configured to ignore input from remote control 232 when the system is in PC mode. Any type of control configuration blocking or permitting a mode change based on input from remote control 232, PC 102 or media sources such as Internet/LAN 104, broadcast receiver 105 or local video source 106 may be implemented.

Remote control 232 may be used to switch between TV mode and PC mode. In addition, remote control 232 may also be used to control PC functions from the display of television 112. For example, remote control 232 may have a mouse pad type interface that permits a user to remotely control a mouse input for PC 102, so that the user can manipulate functionality of PC 102 using television 112 as a display. In addition, remote control 232 may be used to control television 112, such as through an IR port or a set top box used in conjunction with television 112.

Figure 3A:
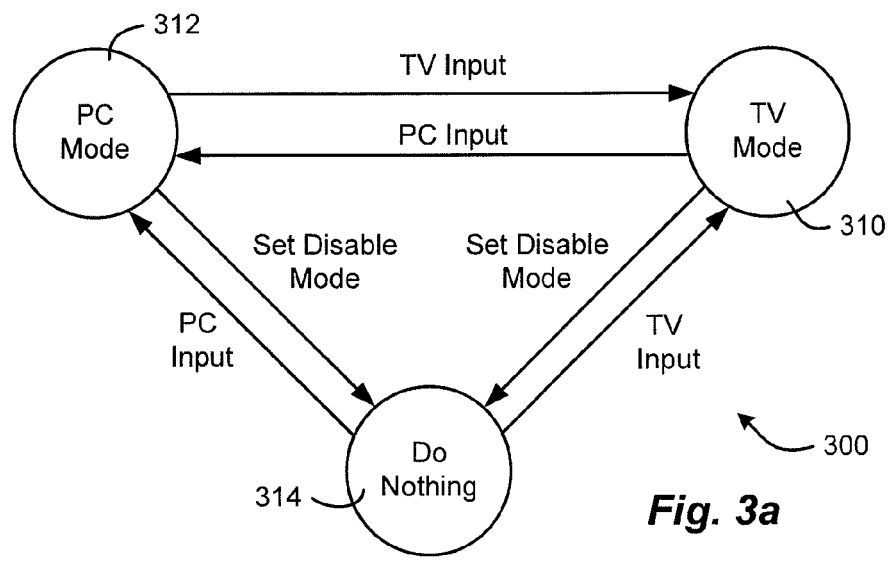
FIGS. 3a and 3b are state diagrams illustrating mode switching.

Referring to FIG. 3a, an exemplary embodiment for changing modes between PC mode and TV mode is illustrated as a change in state for a state machine 300, in which the states are TV mode 310, PC mode 312 or Do Nothing state 314. State machine 300 can be implemented in video system 100. In this configuration, a state change from PC mode 312 to TV mode 310 can occur with a command or other input to PC 102 or with a command or other input from remote control 232. For example, remote control 232 can be configured to initiate a mode change from PC mode 312 to TV mode 310 when a command is input to a PC 102 or video controller 110 from remote control 232, or when any input of remote control 232 is activated, such as by the press of a button, as may occur with a change in volume input to remote control 232, for example. PC 102 may also be provided with software to permit a user to enter a command input to cause a mode change from PC mode 312 to TV mode 310 while the user is located at PC 102. Video controller 110 may also be configured to accept input from various sources to cause a mode change. Such sources may include PC 102, remote control 232 or other peripherals coupled to video controller 110.

Video controller 110 may be configured to cause a mode change from TV mode 310 to PC mode 312 while in TV mode 310 based on a specified input such as a command input to remote control 232 or a command or other simple input to PC 102. In the case of an input to remote control 232, a user can cause a mode change to PC mode 312 by entering a command or other specified input to remote control 232. Such a mode change may also be configured in video controller 110 to occur with an input to PC 102, such as a mouse movement or keystroke entry, for example.

Video controller 110 can be put in a waiting, or a Do Nothing state 314, in which it simply passes video from a connected video source, including video sources connected to PC 102, to television 112, without resolution changes. Do Nothing state 314 can be entered from PC mode 312 or TV mode 310, and conversely, TV mode 310 or PC mode 312 can be reached from Do Nothing state 314.

Entering TV mode 310 causes a number of actions as described above. For example, the video resolution provided by PC 102 is captured and saved. A resolution list can be created that includes a resolution suitable for monitor 108 and available in PC 102, and a resolution suitable for HDTV video. When entering TV mode 310, the merged video resolution list is provided to PC 102, and a DDC read is forced by sending a command to PC 102, for example over USB connection 107. PC 102 responds with video resolution suitable for high definition television.

Video controller 110 can provide control information to and communicate with PC 102 through USB connection 107. PC 102 can also provide control information and data to video controller 110 by communication over USB connection 107. According to an exemplary embodiment, video controller 110 can provide control information to PC 102 to install an audio device to support audio broadcasting to television 112 as described in greater detail below. If PC monitor 108 does not support television type resolution, monitor 108 may be turned off. In addition, monitor 108 can be turned off or provided with a display such as a suitable message when privacy mode is enabled, as discussed in greater detail below.

When video controller 110 changes state to PC mode 312, such as may be prompted by a type of input at PC 102, or a specified input from remote control 232, a number of actions specific to PC mode 312 occur. For example, video controller 110 provides a video resolution to PC 102 that was previously captured and saved from monitor 108, and a DDC read is forced. PC 102 is thus configured to have a video resolution suitable for monitor 108 in PC mode 312. In addition, video controller 110 sends control commands over USB connection 107 to PC 102 to disable and uninstall the audio device used in support of video being provided to television 112. A video feed to television 112 may also be disabled if a privacy mode is enabled, as discussed in great detail below. Finally, video controller 110 causes monitor 108 to be enabled if it is in a disabled or turned off state.

Figure 3B:
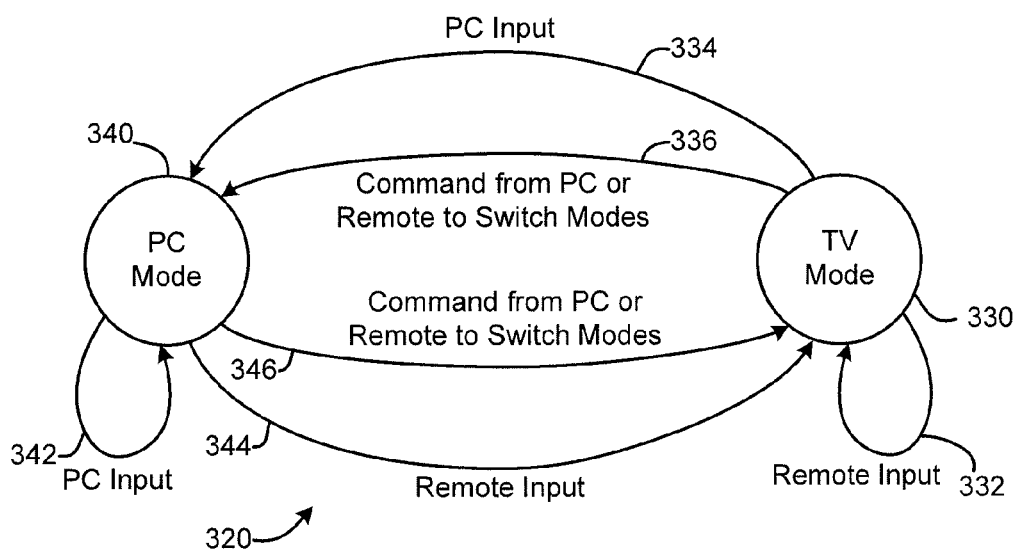

Referring now to FIG. 3b, another exemplary embodiment of the disclosed system and method is illustrated with a state machine 320. State machine 320 illustrates how mode changes between a TV mode 330 and a PC mode 332 may occur. Each of these state changes or state transition paths illustrated in state machine 320 can be implemented in video controller 110. For example, video controller 110 may be configured to provide certain state transitions between TV mode 330 and PC mode 332 based on a user or device input.

If video controller 110 is in TV mode 330, video is directed to one or more televisions, such as television 112, or one or more channels available for broadcast using coaxial cable 220 (FIG. 2). In TV mode 330, video controller 110 may receive inputs from PC 102 or remote control 232, for example. A typical input from remote control 232 may be directed to a local television, such as television 112, using an IR connection, for example. In such an instance, video controller 110, sensing such an input to remote control 232, maintains a state of TV mode 330. If video controller 110 is in TV mode 330, and receives from PC 102 or remote control 232 a command to switch modes, a state change 336 is prompted to change to PC mode 340. The command from PC 102 or remote control 232 may be specifically identified to video controller 110 as a mode change command, so that a user may cause a mode change from TV mode 330 to PC mode 340 using either PC 102 or remote control 232. In addition, a state transition 334 causes a mode change from TV mode 330 to PC mode 340 with a simple input to PC 102. For example, a mouse movement or keystroke entry at PC 102 may prompt state transition 334 to put video controller 110 into PC mode 340. Video controller 110 has a setup configuration to permit a user to select how such state transitions should occur, such as by identifying a command at PC 102, or remote control 232 for causing a state transition from TV mode 330 to PC mode 340. For example, video controller 110 has a set up configuration for a user to choose which, if any, simple PC input may cause state transition 334 from TV mode 330 to PC mode 340.

When video controller 110 is in PC mode 340, state transitions 342, 344 and 346 can be implemented to maintain PC mode 340 or change modes to TV mode 330. State transition 342 maintains PC mode 340 upon a simple input to PC 102 such as a mouse movement or keystroke entry. State transition 342 to maintain PC mode 340 with a simple PC input can be configured in video controller 110 using a set up configuration available to the user. The same is true for state transition 332 to maintain TV mode 330, in that the user may provide a set up configuration to determine inputs to remote control 232 that maintain TV mode 330.

Video controller 110 transitions from PC mode 340 to TV mode 330 with a command from PC 102 or remote control 232, as illustrated with state transition 346. The specific commands from PC 102 or remote control 232 to cause state transition 346 can be set within video controller 110 during a configuration set up. As an example, a user may execute a program by activating an icon at PC 102, which causes state transition 346 to switch video controller 110 from PC mode 340 to TV mode 330. With respect to remote control 232, a specific button sequence or menu selection on a display provided to television 112 may be used to cause state transitions 336 or 346. Video controller 110 is configured in either case for the command entry at PC 102 or remote control 232 to provide a mode change. Video controller 110 may also be configured to cause state transition 344 from PC mode 340 to TV mode 330 with a simple input to remote control 232, such as a volume change input or the press of a menu key on remote control 232.

In each of the above state transition situations, a user can cause a mode change with specific or general input to PC 102 or remote control 232. The configuration for how the mode change may be prompted is set in a configuration set up for video controller 110.

Figure 4:
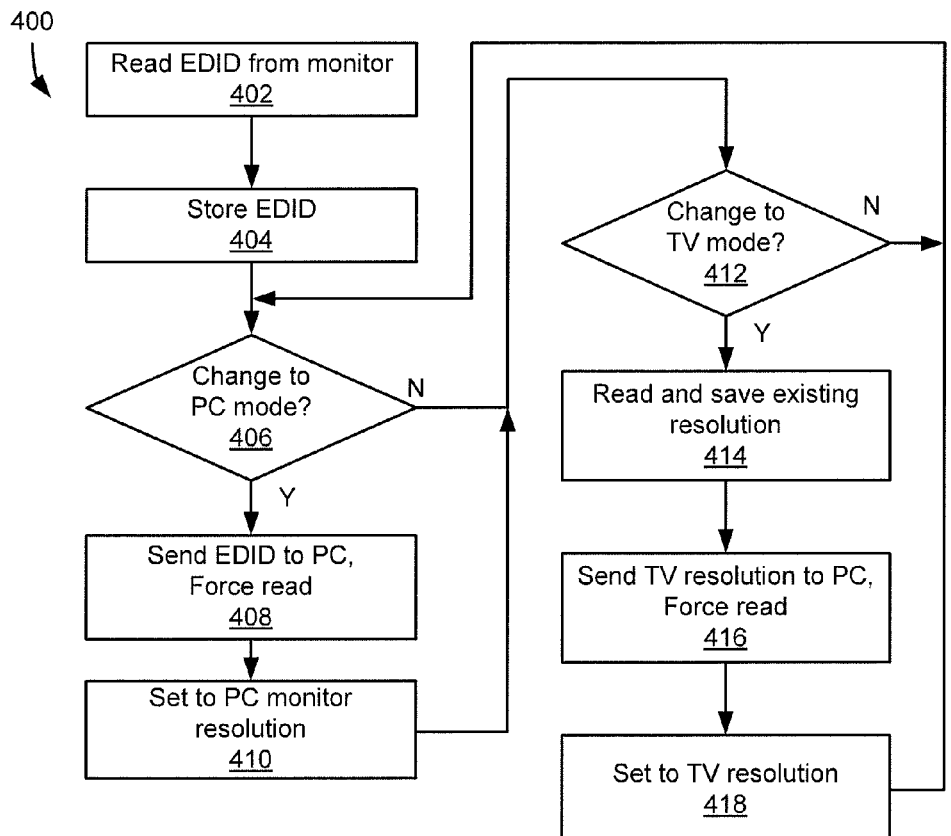
FIG. 4 is a flow chart illustrating mode switching.

Referring now to FIG. 4, a flow chart 400 illustrates a process for a mode change. The process illustrated in flow chart 400 may be implemented using state machine 300. Block 402 shows the reading of the EDID from the monitor, such as PC monitor 108. In block 404, the EDID is stored in video controller 110, for later retrieval and use. Decision block 406 determines if a change to PC mode should be undertaken. The determination made in decision block 406 can be based on a detected input to PC 102. Input to PC 102 can take the form of direct input, such as through a keyboard or mouse, or indirect input, such as through a peripheral such as remote control 232. If a mode change should occur, processing proceeds along the Yes branch of decision block 406 to block 408, in which the EDID that was stored in block 404 is provided to PC 102. In addition, a command is provided to PC 102 in block 408 to cause PC 102 to read the EDID and change to the specified resolution. In block 410, the resolution for PC monitor 108 is changed to that indicated in the EDID supplied to PC 102 in block 408. Processing then proceeds to decision block 412, in which a determination is made whether a change to TV mode should be made. Decision block 412 is also reached on the No branch from decision block 406.

If it is determined in decision block 412 that a change to TV mode should be made, processing proceeds along the Yes branch of decision block 412 to block 414 in which the present video resolution is read and saved for further mode changing uses. In block 416, a resolution corresponding to TV mode is sent to PC 102, and again a command is provided to PC 102 to force a read of the resolution. In block 418, PC 102 reads the new resolution, and changes the video resolution to that indicated, which should be suitable for use with television 112. Upon completing the mode change in block 418, processing returns to decision block 406 to detect whether another mode change should occur. Decision block 406 can also be reached from the No branch of decision block 412. If no mode change is detected by decision block 406 or decision block 412, processing in flow chart 400 cycles between decision block 406 and 412 until a mode change prompt is detected, such as an input from a respective device.

Privacy Mode

In accordance with another exemplary embodiment of the disclosed system and method, video controller 110 can be configured to provide a privacy mode, as selected by the user. Privacy mode acts like a one-way switch for video content delivered either to PC 102 or television 112 when enabled. For example, with privacy mode enabled, if video controller 110 is in PC mode, the video resolution is set up for the video output of PC 102 to be displayed on monitor 108, and privacy mode prevents the broadcast of the video to television 112. Similarly, when video controller 110 is in TV mode, the video provided by PC 102 is directed to television 112, with the appropriate video resolution installed in PC 102, and monitor 108 is turned off. In an exemplary embodiment, privacy mode is enabled as a default mode for system 100.

Optionally, video controller 110 can cause PC monitor 108 to display a message indicating that television 112 is active in TV mode, and no video is provided to monitor 108. With such a message, a user approaching PC 102 can receive information regarding the mode of video controller 110, rather than a blank screen on monitor 108. Similarly, in PC mode, television 112 can receive a simple message or video indicating that PC mode is active in privacy mode so that no video is directed to television 112. Alternately, the channel for broadcast selected by video controller 110 can be turned off, so that television 112 receives no video that is produced by PC 102.

According to another exemplary embodiment, video controller 110 is configured to provide an option for a measure of security in privacy mode. For example, if a user wishes to change modes between PC mode and TV mode, a display is provided to monitor 108 or television 112 indicating that privacy mode is enabled, and an alternate display output is in use. If video controller 110 is in PC mode, television 112 displays a message indicating that privacy mode is enabled, and if video controller 110 is in TV mode, monitor 108 displays a message indicating that privacy mode is enabled. In either mode, the message displayed on PC monitor 108 or television 112 indicates that privacy mode is enabled, and prompts the user for an input to disable privacy mode or to change modes. The input can be a security input, such as a password or input sequence that can be provided at PC 102 or through remote control 232, for example. When the user provides the appropriate input, privacy mode can be disabled, or a mode switch can be enabled.

According to an exemplary embodiment, a setup screen is provided to PC 102 or television 112 to permit the user to configure video controller 110 with respect to privacy mode. For example, the configuration display provided to PC 102 or television 112 can include check boxes for enabling or disabling privacy mode. The display may also have selections available for causing respective monitor 108 or television 112 to turn off or to display a given message when it is not selected in accordance with whether PC mode or TV mode is currently selected. The configuration display may also indicate a security setting for preventing mode switches or for disabling privacy mode. For example, the security setting may be a password a user can enter in PC 102 through a keyboard or through remote control 232.

EDID Modulation for Overscan

HDTVs have a video display overscan and/or underscan, in which an actual video display resolution is larger or smaller than the visible screen area. The concepts of overscan and underscan were originally implemented in analog televisions to stabilize an edge area of a video image for display prior to becoming visible on the actual display. If video taken from a PC video source is displayed on an HDTV screen, the entire overscan or underscan area is used for the display by default, causing the display to be cropped so that a portion of the available video display is not visible in the actual display area of the HDTV screen.

According to an embodiment of the disclosed system and method, an overscan and/or underscan compensation is provided to customize the display of PC video content for television 112. Underscan is typically provided in terms of percentages of full screen resolution size. For instance, 85% of 720 p is a resolution of 1088×612 or 15% underscan. While some manufacturers call for 15% underscan to work for almost all televisions (SDTV and HDTV), in practice such an underscan often leaves black bars around the edges of the screen on most TVs. In accordance with an exemplary embodiment, the proposed underscan compensation uses 15% underscan as starting point for presentation to the user. Various tools are provided to permit the user to adjust and scale the video output displayed until the visible picture matches the actual dimensions of the television screen.

Figure 5:
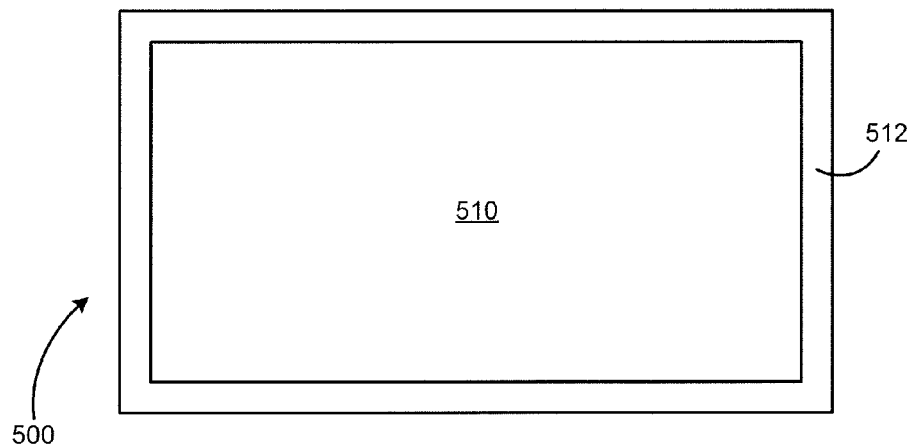
FIG. 5 is an illustration of an HDTV display area with a superimposed overscan display area.

Referring to FIG. 5, overscan compensation begins with video controller 110 providing a calibration page 510 displayed on a visible area 512 of television 112 to configure the custom underscan resolution. Calibration page 510 is initially sized as an interior rectangle on visible area 512 of television 112 with dimensions that attempt to match the visible picture with the actual screen size using 15% underscan. The user is prompted to identify the top left corner and bottom right corner of visible area 512 of television 112. That is, the user is prompted to fill visible area 512 of the television screen with a size adjusted calibration page 510. According to one aspect, a stepped control is provided to permit the user to expand calibration page 510 in a horizontal and a vertical direction, and move the page in a translational movement. Calibration is finished when the user has dragged or positioned the upper left corner of the rectangle to the top left of visible area 512 of the television screen and dragged or positioned the lower right corner of the rectangle to the bottom right of visible area 512 of the television screen. According to one aspect, a set of controls on a remote control, such as remote control 232, provide the stepped controls used to adjust the rectangle in television 112.

Internally, video controller 110 normalizes a dimension of the rectangle so that the aspect ratio of 16:9 is not altered and the target resolution is a factor of 8. Other target resolution factors may be used, such as factors of 16 or 32, which may help to simplify implementation. The resolution is identified by four pieces of information, the top left x and y coordinates and the width and height values. The x,y coordinates are offsets from 0,0 (top left corner). The x,y coordinates can help to identify or adjust the location of the digital picture with respect to the analog input applied to ADC 210.

Once the dimensions of the rectangle are established, video controller 110 stores the relevant parameters. The parameters may be stored in the form of a video resolution, and may be added to or form a part of an EDID. Video controller 110 may then provide the resulting video resolution to PC 102, such as in the form of an EDID, to request a specific, customized video resolution. In addition, one or more customized video resolutions obtained as discussed above can be merged with a standard HDTV video resolution and provided to PC 102 so that video controller 110 can determine if the graphics card for PC 102 can support the desired video resolutions. Moreover, providing a number of different video resolutions, including multiple overscan resolutions, to PC 102 permits selection from among different available video resolutions. With the customized video resolution available in PC 102, the entire picture output is visible on television 112, even if television 112 implements an underscan configuration. According to one aspect, video controller 110 constructs a custom EDID and writes the associated data into an EEPROM in monitor 108 in accordance with the DDC standard. According to another aspect, the user is asked to verify the new resolution. If the user accepts the resolution, the specifics of the video resolution are stored for later use, in particular for mode switching between PC mode and TV mode.

According to an exemplary embodiment, video controller 110 supports a number of televisions 112. Overscan compensation is television specific, so that support for multiple televisions is provided by video controller 110 storing specific resolutions for each television. In addition, or alternately, if the user changes video resolution of the HDTV, for example, from 720 p to 1080 i, the same or new customized video resolutions can be used. The user can be prompted to customize the video resolution for whichever video resolution mode is chosen for the HDTV.

As an example, the customized resolution information is in the following format:

X: integer, Y: integer, Height: integer, Width: integer

Using the above example of 15% of overscan, with a video resolution of 1088×612, supplying such a video resolution to PC 102 works well with most video adapters operating in a windowed application environment. That is, once the customized video resolution is established, and an appropriate EDID is produced, providing the customized EDID to PC 102 causes PC 102 to provide the customized video resolution without additional configuration or scaling, for example. This facility avoids additional difficulties or challenges that may be encountered if customized display drivers were to be written for the customized video resolution, for example.

Audio Switching

According to another aspect of the disclosed system and method, a switch between modes such as PC mode or TV mode causes a redirection of the audio output available from PC 102. PC 102 outputs an audio signal to a single target at a time. In PC mode, the audio signal is directed to the PC speakers. In TV mode, the audio signal is directed to a USB device driver, and captured by video controller 110 through USB connection 107 for mixing with an MPEG2 transport stream, in accordance with an ATSC specified AC3 (Audio Codec 3) encoding standard, also referred to as the Dolby Digital standard. The AC3 encoding standard provides for up to six audio channels, typically corresponding to different speaker locations. This audio encoding standard is also commonly referred to as 5.1 digital.

The broadcasting of video on television 112 calls for video supplied by PC 102 to have synchronized image and audio information. Synchronization is maintained between image and audio information by providing a timestamp to both the image and audio information presented to video controller 110. The timestamps are used to create MPEG2 timestamps to synchronize audio and video streams as supported by the MPEG2 standard. Television 112 synchronizes playback of image and audio in accordance with the timestamps applied to the streams.

PC 102 may also supply pulse code modulated (PCM) audio signals in addition to or as an alternative to 5.1 digital. To obtain an audio signal from PC 102, video controller 110 supplies a Dolby Digital 5.1 device configuration to PC 102. The device configuration may appear in PC 102 as a USB headset, for example. To handle PCM audio signals, the audio driver in the device configuration can convert PCM to AC3. The audio driver can also convert other types of audio codec inputs, such as by using a standard DLL available, for example, in a Windows® environment. Alternately, conversion of PCM audio signals can be done within video controller 110.

In accordance with an exemplary embodiment, video controller 110 detects an input to either PC 102 or television 110, and causes a corresponding mode change to PC mode or TV mode, respectively. When video controller 110 causes a mode change to PC mode, control signals are provided to the USB connection 107 to cause PC 102 to remove a USB audio device associated with video controller 110. When the USB audio device is removed, there is no longer an audio device presented to the PC for USB audio for video controller 110. Without the USB audio device, PC 102 defaults to the prior audio output, such as the PC speakers, as the target for audio output.

When video controller 110 causes a mode change to TV mode, video controller 110 installs a USB audio device using control commands provided to the USB port over USB connection 107. Once the USB audio device is installed, PC 102 is provisioned with a USB digital audio device for audio output. The USB digital audio device is capable of carrying 5.1 digital, as discussed above.

The USB port in this exemplary embodiment may operate as a composite device. Video controller 110 generally presents itself as a serial device to PC 102 on the USB port at USB connection 107. Presenting video controller 110 as a serial device permits control and command signals to be exchanged between PC 102 and video controller 110. When a USB audio device is also installed in PC 102, the resulting composite device performs several functions, including provisioning of an audio signal to video controller 110, and message passing by video controller 110.

Some embodiments of PC 102 can present challenges in consistently implementing a USB audio device. Accordingly, another exemplary embodiment of the disclosed system and method provides for deleting or disabling all other audio devices in PC 102 prior to installing the USB audio device. In this embodiment, PC 102 has no discretion on the choice of an output audio device, since a single device is presented to PC 102 for audio output. Similarly, in a switch to PC mode, video controller 110 deletes or disables the USB audio device and re-enables or re-installs the PC default audio output device as a sole choice for audio output by PC 102.

Quality/Latency Scaling

In accordance with an exemplary embodiment of the disclosed system and method, a dynamic control for video quality level and signal latency is provided between television 112 and controls for PC 102. High definition digital encoding uses the MPEG2 encoding scheme, which is computationally intensive. When MPEG2 encoding is provided for a video stream in real time, such as that produced by video controller 110 in accordance with an exemplary embodiment, quality is improved by analyzing a greater number of frames of a video input. The computationally intensive encoding, coupled with an increased number of video frames to analyze, can cause a high degree of latency between PC 102 as a video source and television 112. The latency can cause difficulties if a user chooses to interact with the video display on television 112 to control PC 102, such as often occurs with the use of a mouse cursor provided through a mouse action. For example, a remote control, such as remote control 232, may be used to remotely command a mouse cursor at PC 102 that is displayed on television 112. The high latency for providing real-time video showing the mouse cursor movements on television 112 can cause mouse cursor control efforts to be minimally effective, if not altogether useless. Typically, if a user is viewing a video stream at television 112 without interaction with PC 102, a high degree of latency is acceptable and even desirable to permit a higher quality video presentation. However, in the case of controlling inputs that are fed back in the form of video to the user on television 112, a high degree of latency can render the templates ineffective, as described above.

In accordance with an exemplary embodiment of the disclosed system and method, input latency is reduced in a video transport signal to permit video control features, such as mouse cursor movements, to be displayed with little or no effective delay, as observed by the user. In this embodiment, latency is reduced by modifying the buffering for the video presented on television 112. For example, video controller 110, in processing the MPEG2 video stream, may cause selected frames to be dropped in the image frame transmission. In this instance, the audio signal is unmodified, so that there is no interruption in the audio provided at television 112. Encoding the audio signal represents a much less computationally intensive effort, so that leaving the audio signal unmodified does not significantly impact latency in the video transport channel. Alternatively, or in addition, the effective frame rate is reduced and/or a video frame buffer content for television 112 is reduced, permitting input video to be more responsive to user actions.

Accordingly, video controller 110 processes keyboard and mouse input from a television associated input device, such as remote control 232, in a reduced latency environment. The reduced latency measured from the output of the VGA adapter to the display on television 112 is preferably in the range of 30-60 ms to provide a suitable response time for input to PC 102. When not processing keyboard and mouse input, video controller 110 can cause latency to increase to promote video quality of the video provided to television 112.

Under normal MPEG2 encoding operations, the encoder takes a varying amount of time to encode a frame. Some frames take longer than an average frame interval to encode, while others are encoded in a shorter period of time than an average frame interval. Accordingly, video controller 110 sends some frames faster than the nominal or average frame rate in the video transport channel, causing a buffer build up on television 112. The frames sent to television 112 at a faster rate permit video controller 110, and in particular DSP 214 to take longer than a frame interval to encode a given frame. If video controller 110 provides frames at the frame rate of television 112, a frame buffer depth at television 112 does not change.

A switch to low latency mode occurs with the detection of a user input that causes an input to PC 102. Upon detection of user input, the transition to low latency mode reduces the frame rate to drain the frame buffer of television 112. The frame rate can be reduced by dropping frames in the video transport channel, for example. Draining the frame buffer of television 112 does not necessarily represent a problem for video display on television 112, since once the frame buffer in television 112 is drained, television 112 can automatically slow down the display rate. Television 112 can also have a variable frame display rate to display some frames faster than others, so that gauging a number of frames in the frame buffer of television 112 can be somewhat inexact.

Once the frame buffer of television 112 is reduced to a smaller number of frames sufficient to reduce the overall latency between the VGA output and video display on television 112, the effect of inputs provided to PC 102 can be observed with an acceptable amount of delay. The reduced latency permits the user to provide input to PC 102 and observe the resulting video activity on television 112 to produce an effective control loop for the user.

Various criteria can be used to transition out of low latency mode into high quality mode where the frame rate provided by video controller 110 can be increased. For example, a mode change to high quality mode can occur if no user input has been detected for a certain time interval, such as, for example, five seconds. The type of user input may be used as an indication for a mode change, for example, maintaining low latency mode with mouse cursor movements, and increasing quality and latency with selection inputs, such as may be provided in activating a pushbutton control displayed on television 112. Low latency mode can also be maintained indefinitely, until the occurrence of a given event, such as a selection provided by the user to return to high quality mode. Transitions between low latency mode and high-quality mode may occur over approximately 10-15 frame times, for example, which may match an expected buffer frame quantity during operation in a normal, high-quality mode.

According to an aspect, video latency is adjusted on a dynamic basis. For example, observed mouse activities causes the video quality to be decreased rapidly with an attendant decrease in latency. A decrease in video quality and latency is maintained until the occurrence of a particular event, such as the expiration of a time interval from a last observed mouse event. Alternately, or in addition, if a limited number of mouse events are observed, the picture quality is increased to a point at which the limited mouse activity can be accommodated with an acceptable level of latency within the above described range. If limited or no mouse events are observed for a given period of time, the picture quality is increased, either rapidly or gradually, until full picture quality is restored or another mouse event is observed.

Figure 9:
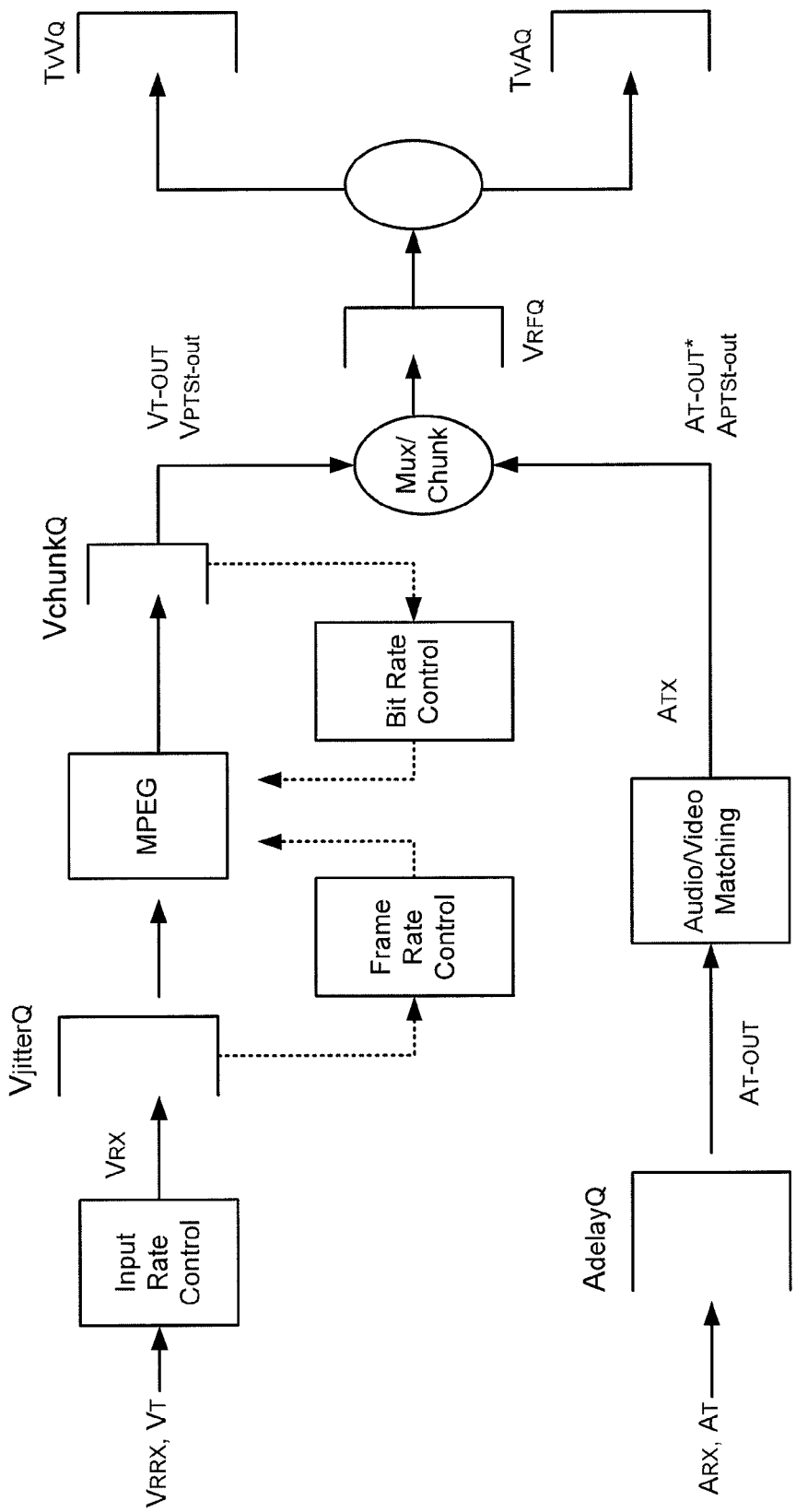
FIG. 9 is a block diagram illustrating an architecture for quality/latency mode switching.

Referring to FIG. 9, a block diagram is provided that illustrates latency control accordance with an exemplary embodiment of the present disclosure. The following description and data relates to the latency control.

| Terms and Definitions | |
|---|---|
| $V_{RRX}$ | Raw video receive rate |
| $V_T$ | Video packet received at time t |
| $V_{RX}$ And Input Rate Control | Video receive rate. This rate drives the entire system - to, and including, the TV. It is very important that this rate is as constant as possible and over time 100% accurate. For $V_{RRX}$ = 60fps, having $V_{RX}$ = 20fps or 30fps is easy. Going to $V_{RX}$ = 35fps: accept every other one and 2 in a row every $12^{th}$     if ((i & 1) == 0)        receiveFrame( );     if (i % 12 == 0)        receiveFrame( ); For $V_{RX}$ = 40fps, the second if is mod 6. |
| $V_{jitterQ}$ and Frame Rate Control | Handles varying mpeg delay. Inverse of $TvV_Q$ $V_{jitterQ} = TvV_{startQ} - TvV_Q$ Queue depth is used to control MPEG frame rate processing time so that $V_{jitterQ}$ = 1 most of the time. As $V_{jitterQ}$ approaches $TV_{startQ}$, speed up frame rate As $V_{jitterQ}$ approaches 0, slow down frame rate If $V_{jitterQ} == TV - V_{startQ}$ then TV has underrun → ERROR! Note that having the $V_{jitterQ} == 0$ frequently just means the quality will suffer unnecessarily (assuming $V_{RX}$ is maintained properly). But, having $V_{jitterQ} == TvV_{startQ}$ is a bad error, so erring on slightly lower quality is far more desirable than causing a TV underrun. |
| $TvV_{delay}$ | Amount of delay, in time, maintained by TV for video $TvV_{delay} = TvV_{startQ} * 1/V_{RX}$ |
| $TvV_{startQ}$ | Initial amount of delay, in frames, on TV for video $TvV_{startQ} = (TvV_{delay} * V_{RX})$ For High-Quality Mode, $TvV_{startQ}$ = 5 For Low-latency Mode, $TvV_{startQ}$ = 1 |
| $TvV_Q$ | Ongoing TV queue depth $TvV_Q = TvV_{startQ} - V_{jitterQ}$ |
| ChunkInterval | Should send audio frames at the audio frame rate, even if video frames are sometimes much longer. ChunkInterval < $1/A_{RX}$ In order to handle slight skew, ChunkInterval = 10ms. However, since $A_{delayQ}$ will always have at least one audio buffer, the ChunkInterval could probably be $1/A_{RX}$ |
| $V_{ChunkQ}$ and Bit Rate Control | Small queue to map mpeg buffer size to chunk buffer size. Size of queue should be constant at 2 mpeg buffers (presently 2 frames). While one buffer would be better for latency, to map chunk-to-mpeg buffer, there should be two. $V_{chunkQ} = 2 * mpeg\_buffer\_size$ MPEG bit rate is used to maintain the depth of 2. If $V_{chunkQ} > 2$, slow down data rate if $V_{chunkQ} < 2$, speed up data rate |
| $V_{T-OUT}$ | Video packet to be sent, with timestamp of t-out |
| $V_{restartFlag}$ | Detect when there is no video. If [ $V_{PTS-previous} == 0 \parallel (PCR - V_{PTS-previous}) > TvV_{delay}$ ]     $V_{restartFlag}$ = TRUE else     $V_{restartFlag}$ = FALSE |

-continued

| Terms and Definitions | |
|---|---|
| $V_{PTSt\text{-}out}$ | PTS of packet $V_{T\text{-}OUT}$<br>If [ $V_{restartFlag}$ ]<br>    $V_{PTSt\text{-}out}$ = PCR + $TvV_{delay}$ → restart case<br>else<br>    $V_{PTSt\text{-}out} = V_{PTS\text{-}previous} + 1/V_{RX}$<br>$V_{PTS\text{-}previous} = V_{PTSt\text{-}out}$ |
| $TvA_{StartQ}$<br>$TvA_{delay}$ | TV audio delay. Since ATSC specified very small audio buffer in TVs, keep this low. Recommend 2 audio frames when in High Quality Mode and 1 when in Low-Latency mode<br>$TvA_{startQ} = 2$ (HiQ)<br>$TvA_{startQ} = 1$ (LL)<br>$TvA_{delay} = TvA_{startQ} * 1/A_{RX}$ |
| $A_{TX}, A_{T\text{-}OUT}, A_{T\text{-}OUT^*}$<br>and<br>Audio/Video Matching | $A_{TX} == A_{RX}$<br>An audio packet must be sent every $1/A_{TX}$ seconds.<br>Due to far less audio buffering on the tv than video buffering, $TvA_{delay}$ is typically less than $TvV_{delay}$. So, in order to get the two streams to play at the same time, the video should be buffered in $A_{delayQ}$. In general,<br>$A_{delayQ} == TvA_{startQ} - TvA_{startQ}$ is the target.<br>if [ $A_{delayQ} < TvA_{startQ} - TvA_{startQ} - 1$ ] then<br>    send null audio packet<br>else if [ $A_{delayQ} > TvA_{startQ} - TvA_{startQ} + 1$] then<br>    drop $A_{T\text{-}OUT^*}$<br>else<br>    $A_{T\text{-}OUT^*} = A_{T\text{-}OUT}$ |
| $A_{restartFlag}$ | Detect when there is no Audio.<br>If [ $A_{PTS\text{-}previous} == 0$ || (PCR − $A_{PTS\text{-}previous}$) > $TvA_{delay}$ ]<br>    $A_{restartFlag}$ = TRUE<br>else<br>    $A_{restartFlag}$ = FALSE |
| $A_{PTSt\text{-}out^*}$ | PTS of packet $A_{T\text{-}OUT^*}$<br>If [ $A_{restartFlag}$ ]<br>    $A_{PTSt\text{-}out^*}$ = PCR + $AvV_{delay}$ → restart case<br>else<br>    $A_{PTSt\text{-}out^*} = A_{PTS\text{-}previous} + 1/A_{RX}$<br>$A_{PTS\text{-}previous} = A_{PTSt\text{-}out^*}$ |
| $V_{RF}$ | Queue depth to RF output. Needs to be small to avoid latency.<br>$V_{RF} < 2$ |
| Low-Latency Mode | To enter Low-Latency Mode:<br>    Over a period of 1 second TV-$V_{startQ}$ − 1 packets are dropped prior to entering $V_{jitterQ}$<br>    Set $TvV_{startQ}$ to 1<br>    Set $TvA_{startQ}$ to 1<br>In the present design, audio may be automatically synchronized by dropping ac3 frames. |
| High-Quality Mode | To enter High-Quality Mode:<br>    Set $TvV_{startQ}$ to 5<br>    Set $TvA_{startQ}$ to 2<br>    Over a period of 1 second TV-$V_{startQ}$ − 1 additional packets are added to $V_{jitterQ}$.<br>In the event that $V_{RRX} == V_{RX}$, then the video packets are duplicated.<br>In an exemplary embodiment, audio automatically synchronizes by sending null ac3 frames. |

The video frame input interrupt routine can program the hardware and/or programmatically drop input frames to match the external frame rate ($V_{RRX}$) to the system frame rate ($V_{RX}$). The rate conversion may use integer frequency summing to do the rate match. For the case of an input rate of 24 fps and an output rate of 60 fps:

24 fps*2=48 fps 60 fps−48 fps=12 fps 24 fps/2=12 fps

So, for every frame, double a frame and add to that, every other frame add another one. Since the frame rate of the content is not known, the mapping of interest is from $V_{RXX}$ to $V_{RX}$. Further, a subset of frame rates may be supported, such as VRX values of 24 fps, 30 fps, 35 fps and 40 fps.

Video Jitter Queue $V_{JitterQ}$ should match the frame rate consumption by the TV. The delay in the system, from video controller 110 input to TV display is constant. This is a very important point. The delay is either in the TV or controller and can shift back and forth between the two over time. In this design, this delay is called $TvV_{delay}$. When the TV starts to receive an mpeg stream, the number of frames it buffers is a function primarily of the PTS value in the initial frames—the initial PTS is PCR+$TvV_{delay}$. The ATSC standard indicates that the TV should buffer very little audio, only about 4 AC3 frames. The TV should be able to buffer at least 10-15 video frames. The whole point of PTS is to smooth out display times, allowing varied arrival times. So under normal operation, the PTS intervals for video and audio should not change at all.

The desired system delay, $TvV_{delay}$, or it's frame-count form, $TvV_{startQ}$, should be a system parameter. Ultimately it is used to change between low-latency and high-quality modes. The initial state should be HQ mode. If delay, $TvV_{delay}$, through video controller 110 is 150 ms, and $V_{RX}$ is 30 fps, then $TvV_{startQ}$ is 5. A simplification in describing the system is to assume that when the TV starts to receive an mpeg stream, all delay in the system is on the TV. All video buffers are buffered in the TV. In reality, video controller 110 may start to introduce delay to start with, but that doesn't change the overall system behavior over time. So, the delay exists in either the TV (TvV$_Q$) or in video controller 110 (V$_{JitterQ}$) They sum to TvV$_{startQ}$, or in other words, TvV$_{startQ}$ is the maximum value for V$_{JitterQ}$.

What should be done: as the frame depth in V$_{JitterQ}$ reaches TvV$_{startQ}$, the mpeg encoding process should speed up. In order to experiment with the impact of the frame-rate control, two more parameters are used: low-water and high-water marks for V$_{JitterQ}$ in units of frames. Clearly a check should be done to make sure they are consistent with TvV$_{startQ}$. In order to take the delay added by V$_{chunkQ}$ (next section) and other unaccounted for delays in to account, V$_{JitterQ}$ should stay a few frames below TvV$_{startQ}$.

Output Mixing and Chunking
MPEG Output/Chunking Queue

V$_{chunkQ}$ is used to match the data rate from the mpeg process to the output data rate. This queue should be kept very low, but if it's too low, then the transmission path will not be effectively utilized. If it's too high (greater than 2) then system latency is increased and could cause errors (TvV$_{startQ}$ going empty). What should happen: V$_{chunkQ}$ high and low-water marks should control mpeg output data rate to keep V$_{chunkQ}$ at 2 mpeg output buffers.

Chunking/Muxing

Audio should be transmitted, on average, every 32 ms. The average should be exact and the deviation should not be much. The data showed also be evenly spread out over each 32 ms interval. And finally, the timestamp, PTS, should increment by 32 ms. The audio is evenly spread out over each packet. If there is video available in V$_{chunkQ}$, as much as can fit in the packet is also sent. If there is any room left over, it's filled with nulls. For robustness, there should be one packet (with audio and either video or nulls) being dma'd out to the rf transmitter, and one packet ready in the dma queue. If the packets are 32 ms in size, then the system has a lot of time to prepare the next audio packet (32 ms). On the other hand, that's introducing 64 ms of delay. So, the two buffers should be closer to 10 ms in size, getting delay down to 20 ms.

What should happen: each audio packet should be evenly distributed with either video or nulls in 10 ms-sized packets. This should be done efficiently, without copying video data (99% of the data in the stream). The best approach is probably to have the mpeg process "leaves holes" in the video stream for audio. And, inserting nulls should also be done efficiently. One possible approach is to have an mpeg-sized buffer of nulls, with "holes" for audio. If there is no video buffer in V$_{chunkQ}$, then use the buffer of nulls. This gives the mpeg process a little time to catch up.

Timestamps

In the end, the values for PTS should be pretty straightforward. There is a startup case, or loss of stream case, where the PTS is reset. For both audio and video, if the delta between the present PCR and previous PTS, the TV's queue has been drained and it's time to reset. To reset, the PTS is set to the present PCR plus the desired system delay (TvA$_{delay}$ and TvV$_{delay}$). Once the PTS has been reset, every subsequent PTS, regardless of when it is actually sent, is incremented by the period of the stream frame rate. For the video stream, that's 1/V$_{RX}$ and for audio it's 1/A$_{RX}$.

Audio/Video Matching

Audio should usually be sent. Even when there is no audio being received from the PC, in order to keep the streams in sync, null AC3 packets should be sent. Due to far less audio buffering on the tv than video buffering, TvA$_{delay}$ is typically less than TvV$_{delay}$. So, in order to get the two streams to play at the same time, the video is buffered in A$_{delayQ}$. In general, $$A_{delayQ} = TvV_{startQ} - TvA_{startQ}.$$

In reality, once the above requirement is met, it should stay locked on since audio should be arriving at a constant rate from the source. However, the general mechanism is: if the A$_{delayQ}$ goes much below its target, insert a null audio frame. If it goes much above it, drop an audio frame. The follow shows a range of +−1 audio frame from the target:

```
if [ A_delayQ < TvA_startQ - TvA_startQ - 1 ] then
    Send NULL AC3 packet
else if [ A_delayQ > TvA_startQ - TvA_startQ + 1 ] then
    drop A_T-OUT*
else
    A_T-OUT* = A_T-OUT
```

Initially, it looks as if audio and video can drift out of sync for periods of time. But the PTS values in both streams ensure that the TV displays both streams in sync. As long as the TV buffers (TvV$_Q$ and TvA$_Q$) are never exhausted. The system can implement the audio input queue with the above feedback mechanism to ensure the total system delay for audio. Implementing the audio input queue can include insertion of null audio frames whenever there is no audio, or the queue is not at the correct depth.

Mode switching between high quality mode and low latency mode can be achieved in the form of a state machine. For example, low latency mode as a state can be entered when television associated device input is detected. Similarly, high-quality mode may be entered when no TV associated input is received for greater than five seconds, for example.

Output Channel Selection

According to another exemplary embodiment of the disclosed system and method, video controller 110 reviews available broadcast channels and selects a channel present on the coaxial cable 220 used for local broadcast. Video controller 110 causes channels available on coaxial cable 220 to be quickly scanned and quantified with respect to a level of energy present in each channel. The scanned channels can be categorized based on a level of energy detected in each channel, and a selection of a local broadcast channel can be made in a given category based on a particular criteria. This type of scanning can be much more rapid than a channel scan conducted by television 112, for example. Television 112 can be made to scan channels, however, the scanning operation is directed to decoding channel information such as a channel ID, channel guide information and generally obtaining available channel information provided by a CATV provider, for example. Channel scanning by television 112 may also lock on to a signal available in a channel to ensure proper collection and decoding of channel information.

A channel number and modulation define a channel transmission frequency. For example, channel number 20/QAM has a frequency of 157.25 MHz, while channel number 20/ATSC has a frequency of 507.25 MHz. Also, the carrier frequencies for ATSC and QAM may not be the same. It may be desirable to have video controller 110 provide a different modulation scheme than that which is being used presently on cable 220. For example, QAM may be currently used on cable 220 and it is desirable to transmit on cable 220 using ATSC. According to an exemplary embodiment, video controller 110 locates and selects an ATSC channel in which there is no QAM transmission and no conflicting QAM channels.

In an exemplary embodiment of the disclosed system and method, channels are scanned for energy levels, without necessarily locking onto a channel signal. Scanning for energy levels can detect harmonics in different channels that can be used to contribute to selection of a free channel with reduced energy. For example, it may be preferable to select a channel that has a greater energy level over a channel in which a third harmonic of another signal exists. In addition, broadcasting over a selected channel may cause adjacent channels to be jammed. Accordingly, a channel selection algorithm may consider a breadth of free spectrum, such as may be occupied by three or four channels, for example, within which a broadcast channel is selected.

Scanning for unoccupied channels is referred to as channel vacancy detection (CVD). RF Channels occupy 6 MHz of bandwidth in the USA and Canada. Video controller 110 determines if a channel is occupied by a signal, either over-the-air or over-the-cable. Based on the determination of occupancy, together with a weighting system for types of occupied and/or unoccupied channels, video controller 110 determines an optimized local broadcast channel for supplying video to television 112. The type of channel is determined for each channel scanned. For example, a channel may be occupied with a broadcast signal that is NTSC, ATSC or QAM. Determining the type of channel contributes to selecting an optimal local broadcast channel, for example, with the least likelihood of interfering with occupied channels that already carry a valid signal.

Channel scanning begins by analyzing the spectrum of frequencies available on a cable plant, starting at 55.25 MHz, which is a common carrier frequency for Channel 2 in the USA for both over-the-air broadcast and cable broadcasts. Scanning can continue for each channel up to a top frequency of 864 MHz, which represents a top frequency of channel 135. For each channel selected at 6 MHz intervals, three locations are examined within the 6 MHz band. The NTSC carrier location is measured for signal strength relative to the background energy level and the signal strength is recorded. A second measure is taken at a point 300 kHz up from the bottom of the channel range, where an ATSC carrier would be placed if the Channel were occupied by an ATSC signal. Lastly, the center of the 6 MHz band is measured.

According to an exemplary embodiment, the signal strength measurements are made with a 50 kHz width filter covering a narrow slice of the channel spectrum where there is a point of interest depending on the type of channel that may or may not be occupying that particular band.

Occupation of a given 6 MHz potential channel site is gauged on the strength of the signal in the 50 kHz channel slice based on the following conditions:

| Base + 300 kHz (ATSC) | Base + 1.25 MHz (Carrier) | Base + 3 MHz (Center Freq) | Conclusion |
| --- | --- | --- | --- |
| Low | Low | Low | Empty |
| Low | High | Mid | NTSC |
| High | High | High | ATSC |
| Mid | Mid | Mid | QAM |

Because three discrete points on the potential channel band are checked with a narrow filter, and the relative energy is measured, the scanning process is very fast. The entire band range of possibly occupied channel locations is scanned for the above described signal energies and a map of all the scanned channels is built based on the result of the spectrum analysis.

The High, Mid and Low terms refer to the signal strength measurements made for that channel. A difficulty is presented in the case of an empty channel or a QAM channel where the levels across the channel are all the same. The difficulty arises in part because the signal strengths are measured on a relative basis. According, and empty channel and a QAM channel appear to be relatively similar and are therefore further examined to be distinguished from each other. One method to help increase the relative difference between an empty channel and a QAM channel for detection purposes is by observing that there are at least some channels populated on a cable. Signal strengths for occupied channels can then be determined relative to an unoccupied channel. This method can pose certain drawbacks if all channels are occupied with QAM signals, or if all channels are occupied. Since in such cases the measurable change in signal from channel to channel is insufficient for discrimination of channel types, a reference energy level of, for example, about −25 dbmV is used to determine if a channel is occupied or occupied. Above this reference energy level, the channel is considered to be occupied, while below this reference energy level the channel is considered to be empty.

NTSC television signals are more susceptible to interference from digital television signals, so a method ranking unoccupied channels is employed to allow placement of the local broadcast signal in a channel location least likely to cause such interference, for example. All channels determined to be unoccupied are evaluated for potential use for local broadcasting, for example. The algorithm for selecting the potential local broadcast channel provides a ranking, for example, for channels in accordance with certain criteria. Higher ranked unoccupied channels are more desirable for local broadcast in accordance with this exemplary embodiment.

A first ranking categorization or cut off is made for unoccupied channels with five or more channels of separation from the nearest channel carrying an NTSC signal. The algorithm then ranks the unoccupied channels according to their separation from channels with digital signals. For example, an unoccupied channel with adjacent unoccupied channels on either side is ranked higher than an unoccupied channel with a single adjacent unoccupied channel. An unoccupied channel with a single adjacent unoccupied channel is ranked higher than an unoccupied channel with adjacent occupied channels on either side. Once some or all unoccupied channels are evaluated by rank, and optimal unoccupied channel is chosen with the highest rank.

A number of variations on the above algorithm are available, such as by providing a threshold of acceptability for an unoccupied channel. As the channels are scanned, if a scanned channel is found to be unoccupied, and meets a threshold of having two unoccupied channels on either side, for example, then that channel is selected for local broadcast. In this instance, the scanning operation can be abbreviated.

Alternately, or in addition, each unoccupied channel can be assigned a weighting factor based on proximity to channels carrying an NTSC signal and proximity to channels carrying a digital signal. The weighting factor can be derived by assigning a higher weighting value to nearby channels carrying an NTSC signal, assigning a relatively lower weighting value to nearby channels carrying digital signals and assigning a lowest weighting value to nearby unoccupied channels. The weighting factor for each unoccupied channel can be determined by summing the weighting values in a range of surrounding channels, such as the five channels on either side of each unoccupied channel. The map of scanned channels can then indicate the state of each of the scanned channels, that is, occupied or occupied, and a weighting value for the type of channel present at a given channel site.

Figure 6:
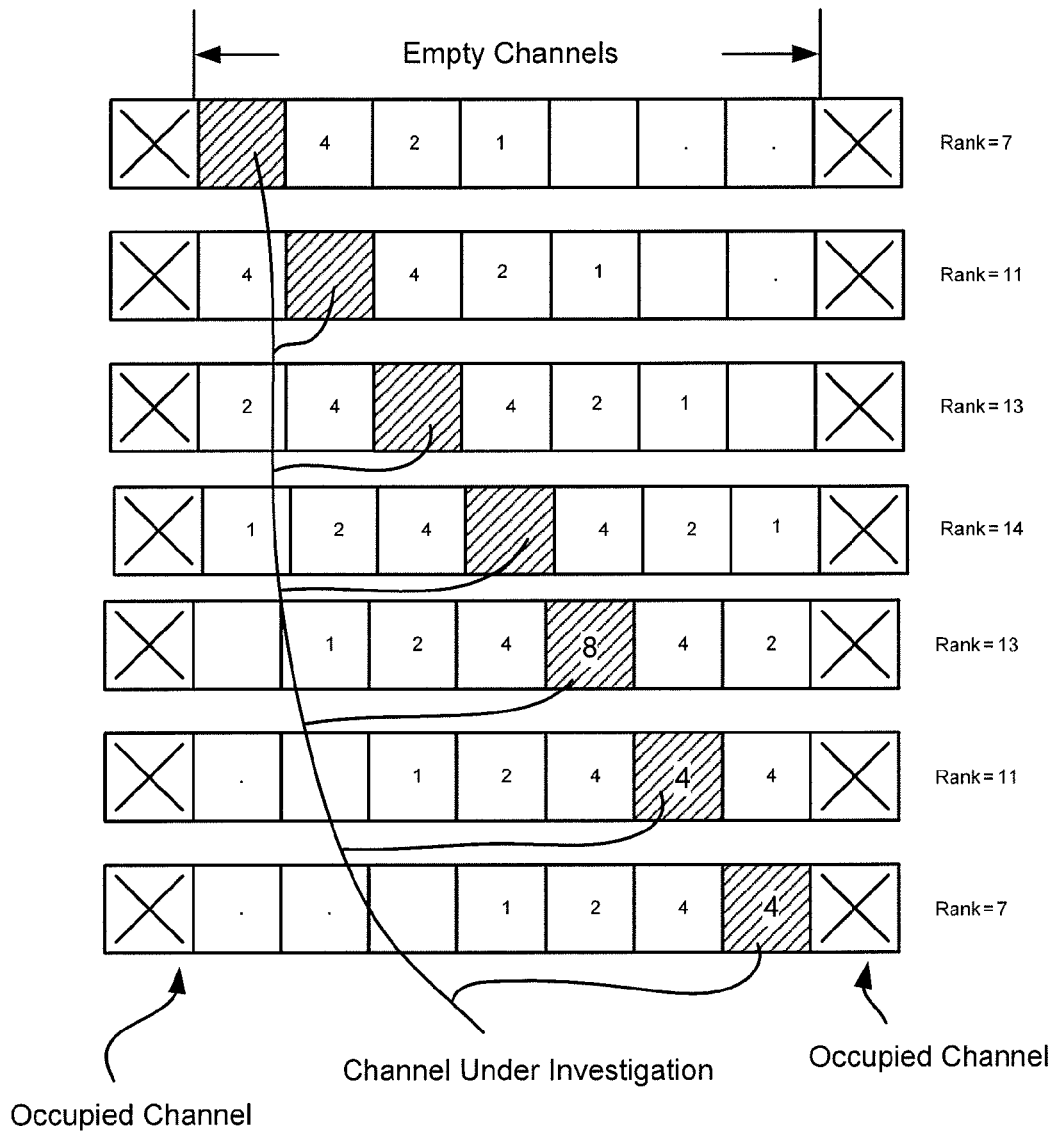
FIGS. 6-8 are block diagrams illustrating channel selection.
Figure 7:
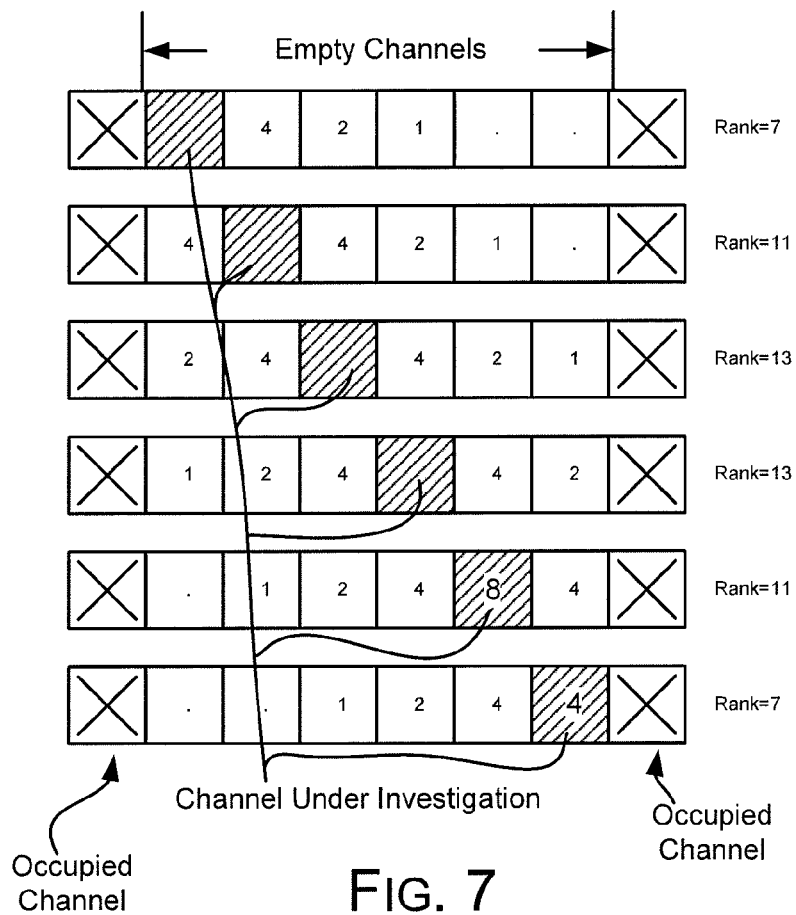
Figure 8:
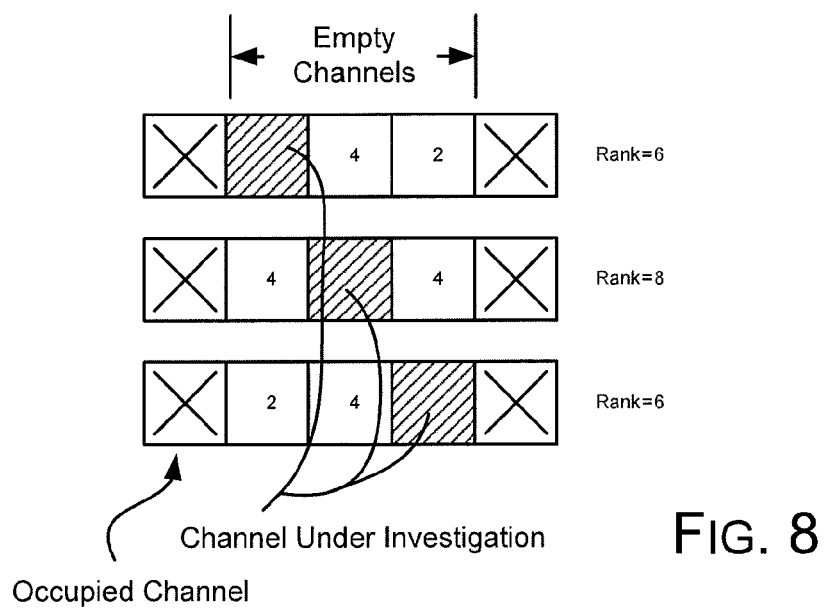

Referring to FIGS. 6-8, an illustration of weighting assignments provided to unoccupied channels is shown. In an exemplary embodiment, all available channels slots are ranked based on their distance from an NTSC signal. Channels with the greatest distance from a channel carrying an NTSC signal are ranked highest. Each channel that has a distance greater than five channel sites away from an NTSC signal has the same rank. At a given NTSC-proximity-rank, the potential sites are ordered based on a weighting scheme.

Each empty channel that is adjacent to the channel being evaluated is given a weight. Immediately adjacent empty channels are given a weight of 4. Empty channels separated by one empty channel are given a weight of 2. Empty channels separated by two empty channels are given a weight of 1. The weights of all the empty channels adjacent to the channel under investigation are summed. The unoccupied channels are then ordered with the highest summed weights being given a higher priority. Ties for the same summed weight are resolved by placing the potential sites furthest from the closest NTSC channel at a higher priority. The resulting highest priority channel is selected for local broadcast.

According to an aspect, once video controller 110 is initialized, a procedure is executed to verify that a previously selected broadcast channel is vacant. Video controller 110 may then begin transmitting on the selected channel. If the selected channel is not vacant, it is marked with a flag, such as having a state marked as conflicting. Video controller 110 may determine, or may receive a command, to initiate a scan for a new channel on which to broadcast. Conducting the scan produces a status for each observed channel that can be maintained in nonvolatile storage. In addition, a free channel listing can be created and also stored.

The operations herein described are purely exemplary and imply no particular order. Further, the operations can be used in any sequence when appropriate and can be partially used. With the above embodiments in mind, it should be understood that the invention can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this invention. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the invention.

What is claimed is:

1. A device for distributing video from a premises personal computer (PC) over a premises signal distribution media to a premises television, comprising:
    a video input interface for receiving video information from the PC;
    a control interface for exchanging control information with the PC;
    a video output interface for providing modulated video signals for transmission over the premises signal distribution media to the television;
    another video output interface for providing output video information to a PC monitor;
    a processing section for processing the video information and including:
        an encoder for encoding the video information into a digital television signal;
        a modulator for modulating the digital television signal onto the video output interface; and
        a controller that is operable in at least a first and a second mode in which the controller sends a respective explicit first or second video resolution to the PC over the control interface to cause the PC to provide the video information to the video input interface with the respective first or second video resolution;
    a video switch communicatively interposed between the video input interface and the another video output interface, the video switch being controllable by the controller in the first mode to direct the video information with the first video resolution from the PC to the another video output interface and in the second mode to direct the video information with the second video resolution from the PC to the encoder.

2. The device according to claim 1, further comprising an audio input interface for receiving audio information from the PC.

3. The device according to claim 2, wherein the encoder is operative to encode the audio information into the digital television signal.

4. The device according to claim 1, wherein the control interface is a serial interface.

5. The device according to claim 4 wherein the serial interface is a Universal Serial Bus interface.

6. The device according to claim 1, wherein the video input interface comprises a Video Graphics Array (VGA) connection.

7. The device according to claim 1, wherein the another video output interface comprises a VGA connection.

8. The device according to claim 2, wherein the audio input interface is a serial interface.

9. The device according to claim 8, wherein the serial interface is a Universal Serial Bus interface.

10. The device according to claim 1, wherein the controller is responsive to input control information to switch between the first mode and the second mode.

11. The device according to claim 10, wherein the controller is operative to prevent video information from being directed to a non-selected one of the another video output interface or the encoder.

12. The device according to claim 1, wherein the modulator is operative to modulate a plurality of digital television signals onto the video output interface.

13. The device according to claim 12, further comprising:
   another video input interface for receiving predetermined video information; and
   the controller being operative to direct the predetermined video information to the modulator for modulating the predetermined video information as one of the plurality of digital television signals.

14. The device according to claim 1, wherein the controller is operative to obtain PC video resolution information through the control interface.

15. The device according to claim 1, wherein the controller is operative to capture video resolution information from either the video input interface or the another video output interface.

16. The device according to claim 14 wherein the video resolution information comprises Extended Display Identification Data (EDID).

17. The device according to claim 1, wherein the controller is operative to capture overscan compensation information and to set a video resolution for the PC based on the overscan compensation information to permit the television signal to provide a display that matches a dimension of a television screen.

18. The device according to claim 1, wherein the controller is operative to provide control signals to the control interface to cause the PC to either install or remove an audio driver for driving audio information to the audio input interface.

* * * * *